US010184850B2

(12) United States Patent
Quigley

(10) Patent No.: US 10,184,850 B2
(45) Date of Patent: Jan. 22, 2019

(54) TORQUE WRENCH ASSEMBLY

(71) Applicant: Raymond Quigley, Lisnaskea (GB)

(72) Inventor: Raymond Quigley, Lisnaskea (GB)

( * ) Notice: Subject to any disclaimer, the term of this patent is extended or adjusted under 35 U.S.C. 154(b) by 253 days.

(21) Appl. No.: 15/041,355

(22) Filed: Feb. 11, 2016

(65) Prior Publication Data

US 2016/0229037 A1 Aug. 11, 2016

Related U.S. Application Data

(60) Provisional application No. 62/114,666, filed on Feb. 11, 2015.

(51) Int. Cl.
*B25B 21/00* (2006.01)
*G01L 5/24* (2006.01)
*B25B 23/00* (2006.01)

(52) U.S. Cl.
CPC .............. *G01L 5/24* (2013.01); *B25B 21/005* (2013.01); *B25B 21/008* (2013.01); *B25B 23/0078* (2013.01)

(58) Field of Classification Search
CPC ............ B25B 23/0078; B25B 23/0085; B25B 21/005; B25B 21/008; G01L 5/24
See application file for complete search history.

(56) References Cited

U.S. PATENT DOCUMENTS

| | | | | |
|---|---|---|---|---|
| 4,027,560 A * | 6/1977 | Parker | ................... | B25B 21/002 81/57.39 |
| 4,429,597 A * | 2/1984 | Grabovac | ........... | B25B 23/0078 81/57.39 |
| 5,398,574 A * | 3/1995 | Spirer | ................... | B25B 13/463 81/57.38 |
| 6,244,138 B1 * | 6/2001 | Campbell | ........... | B25B 23/0078 81/57.4 |
| 7,117,764 B2 * | 10/2006 | Garric | ................... | B25B 21/002 81/57.39 |
| 7,765,895 B2 * | 8/2010 | Junkers | ............... | B25B 23/0078 81/473 |
| 8,020,626 B2 * | 9/2011 | Francis | ................. | B23P 19/069 166/360 |
| 8,157,018 B2 * | 4/2012 | Francis | ................. | B23P 19/069 166/360 |
| 8,347,972 B2 * | 1/2013 | Francis | ................. | B23P 19/069 166/360 |
| 8,413,525 B1 * | 4/2013 | Schultz | ................... | B25B 23/14 73/862.21 |
| 8,443,699 B2 * | 5/2013 | Ha | ........................ | B25B 13/463 81/475 |
| 8,650,990 B2 * | 2/2014 | Riestra | .................. | B25B 21/005 81/55 |
| 9,095,960 B2 * | 8/2015 | Kim | ...................... | B25B 13/461 |
| 9,308,632 B2 * | 4/2016 | Junkers | ................... | B25B 21/00 |

(Continued)

*Primary Examiner* — David B Thomas
(74) *Attorney, Agent, or Firm* — Preston Smirman; Smirman IP Law, PLLC

(57) ABSTRACT

A torque wrench assembly includes a torque wrench head being adapted to both tighten and loosen a fastener, wherein the torque wrench head includes fastener engaging means and drive means for driving the fastener engaging means. The torque wrench assembly also includes means for mounting the torque wrench assembly on a support means, wherein the torque wrench head and the mounting means are adapted so that the torque wrench head is capable of both tightening a fastener and loosening a fastener.

23 Claims, 22 Drawing Sheets

(56) References Cited

U.S. PATENT DOCUMENTS

| | | | |
|---|---|---|---|
| 9,676,084 B2* | 6/2017 | Noel | B25B 17/02 |
| 2013/0074315 A1* | 3/2013 | Slocum | B25B 23/00 29/525.01 |
| 2013/0091992 A1* | 4/2013 | Walsh | B25B 21/00 81/55 |
| 2013/0186642 A1* | 7/2013 | Francis | B23P 19/069 166/380 |
| 2016/0312550 A1* | 10/2016 | Jonassen | B23P 19/061 |

* cited by examiner

TORQUE WRENCH ASSEMBLY

CROSS-REFERENCE TO RELATED APPLICATION

The instant application claims priority to U.S. Provisional Patent Application Ser. No. 62/114,666, filed Feb. 11, 2015, the entire specification of which is expressly incorporated herein by reference.

FIELD OF THE INVENTION

The present invention relates to a torque wrench assembly and in particular to a torque wrench assembly for use on riser sections on off-shore drilling equipment or the like. More particularly the present invention relates to an improved torque wrench assembly which provides for the immediate break out and make up of threaded bolts coupling flanges or riser sections.

BACKGROUND OF THE INVENTION

The use of torque wrench systems to loosen and tighten bolts and nuts within the petroleum industry such as on drilling risers for off-shore drilling contractors is well known. Drilling equipment can or often consists of a series of riser sections joined together in a string and lowered onto a drilled well. Each joint of riser is joined together using flanges. Each riser flange has either 6 or 8 fastener assemblies depending on the model or design criteria. Some riser flanges have fasteners on two separate pitch circle diameters PCD. The fastener assemblies have bores on each flange which are aligned in use. The bottom bore houses a threaded nut for retaining the threaded fastener. The flanges are mechanically coupled by hydraulic torque wrench assemblies driving threaded fasteners into the aligned bores for mechanically coupling the flanges together.

The process of tightening and loosening bolts generally involves two stages: a high torque phase and a low torque phase. This two stage system works with a wrench during the stages of low torque and a ratchet during the stage of high torque. There have been a number of recent attempts to improve upon the efficiency of torque wrench systems by the use of a single device incorporating both mechanisms. However these recent developments are still problematic with regards reliability and performance. Further, recent attempts continuously expose operators to a number of potential hazards such as exposure to high pressure hydraulic lines and quick disconnect couplings, notwithstanding exposure to a variety of known pinch points. The tools also often require stripping down to allow the same tool to make up and break out the same fastener which is a time consuming process. Further problems exist where the reaction arm of the existing tools react against the flange in such a way that a lot of torque is lost through slippage. Furthermore, socket cracking is a common occurrence on the existing tools as a result of misalignment of the torque forces acting through the tool.

SUMMARY OF THE INVENTION

It is an object of the present invention to provide a torque wrench system of improved performance, reliability and safety for the tightening and loosening of fasteners by the utilisation of a single device capable of both providing a wrench during stages of low torque and a ratchet at periods of high torque.

Accordingly, the present invention provides a torque wrench assembly comprising a torque wrench head being adapted to both tighten and loosen a fastener, the torque wrench head comprising fastener engaging means and drive means for driving the fastener engaging means, the torque wrench assembly further comprising means for mounting the torque wrench assembly on a support means, the torque wrench head and the mounting means being adapted so that the torque wrench head is capable of both tightening a fastener and loosening a fastener.

Preferably, the torque wrench head and the mounting means being adapted so that the torque wrench head is capable of both tightening a fastener and loosening the fastener by moving the torque wrench head and/or the mounting means relative to a support means.

Ideally, the torque wrench head is movably mounted on the mounting means so that the torque wrench head is capable of both tightening a fastener and loosening the fastener by moving the torque wrench head relative to the mounting means between a fastener tightening position and a fastener loosening position.

Advantageously, the torque wrench assembly does not require any modifications to the physical components of the torque wrench assembly to allow a fastener to be both tightened and loosened by moving the torque wrench head relative to the mounting means. Prior art torque wrench assemblies require parts of the wrench to be stripped down so as to allow the reverse direction of rotation of the wrench head to achieve fastener make up and break out. The terms make up and break out are interchangeably used throughout this specification and describe the same physical operation as fastener tightening and fastener loosening respectively. The physical adaption of prior art torque wrench assemblies to allow the reverse drive direction for fasteners takes additional time. This additional time can be anything up to thirty minutes and adds undue burden on the drilling contractor. The changeover process also requires additional tools to perform the changeover and requires the rig operator to have knowledge of the particular torque wrench assembly. The current prior art changeover process involves changing flexible hydraulic lines and removing small fasteners from the actual torque wrench assembly. Furthermore, this physical adaption to the prior art torque wrench assembly could affect the originally calibrated function of the torque wrench assembly.

Preferably, the torque wrench head is rotatably mounted on the mounting means.

Ideally, the torque wrench head is pivotally coupled on the mounting means.

Preferably, the torque wrench head is rotatably coupled to the mounting means via a rotatable coupling arrangement.

Preferably, the torque wrench head is free to rotate relative to the mounting means in a clockwise or anticlockwise direction.

Ideally, the torque wrench head can rotate through 180 degrees relative to the mounting means.

Preferably, the torque wrench head can rotate through 180 degrees relative to the mounting means between a fastener loosening position and a fastener tightening position.

Ideally, locking means are provided between the torque wrench head and the mounting means.

Preferably, the locking means can lock the torque wrench head and the mounting means together so no relative movement is possible in at least a fastener loosening position and a fastener tightening position.

Ideally, the fastener engaging means comprises a shaft having means for coupling a socket at one or each end.

Ideally, the drive means comprises a low torque high speed drive means. Advantageously, this low torque high speed drive means allows an operator to run the threaded fastener quickly towards or away from a fastener housing such as a flange.

Preferably, the drive means comprises a low speed high torque drive means. Advantageously, this low speed high torque drive means allows an operator to make up the fastener to the recommended torque value to meet the relevant specification and to break out the fastener for removal or replacement.

Preferably, the low speed high torque drive means can generate a range of recommended torque values.

Ideally, the recommended torque value is in the range of 500 lb/ft to 3000 lb/ft.

Preferably, the recommended torque value is in the range of 800 lb/ft to 1400 lb/ft.

Ideally, the recommended torque value is in the range of 1260 lb/ft.

Preferably, the torque wrench assembly has a ratchet means.

Preferably, the ratchet means is operably coupled to the fastener engaging means.

Ideally, the low speed high torque drive means and the high speed low torque drive means are operably coupled via the ratchet means.

Ideally, the ratchet means is adapted so as to allow the high speed low torque drive means to operate independently of the low speed high torque drive means with the ratchet means disengaged.

Preferably, the ratchet means is adapted so as to allow the low speed high torque drive means to engage the high speed low torque drive means when rotating the fastener into the final position at the predetermined torque setting. Advantageously, when the low speed high torque drive means is operating the ratchet, hydraulic fluid is provided to the high speed low torque drive means causing it to rotate.

Ideally, the ratchet means comprise tubular members formed for enclosing the fastener engaging means.

Preferably, the ratchet means comprise annular members formed for enclosing the fastener engaging means.

Ideally, the ratchet means comprise tubular members formed for enclosing the shaft of the fastener engaging means.

Preferably, the ratchet means comprise annular members formed for enclosing the shaft of the fastener engaging means.

Ideally, at least part of the ratchet means is operably coupled to the fastener engaging means via splines.

Ideally, the ratchet means comprise a pair of outer ratchet members and a pair of inner ratchet members.

Preferably, the outer ratchet members are free to rotate on the shaft.

Ideally, the inner ratchet members are coupled to the shaft via splines.

Ideally, the high speed low torque drive means comprises a motor and gear means operably coupling the motor to the fastener engaging means.

Preferably, the fastener engaging means comprises a shaft, preferably elongate.

Ideally, the shaft has means for coupling a socket on one or each end of the shaft.

Ideally, the shaft has a socket on each end, the open end of which facing away from each other.

Ideally, the elongate shaft is cylindrical.

Ideally, the motor is operably coupled to a worm gear assembly for rotating the fastener engaging means.

Preferably, the worm gear comprises a worm and a worm wheel.

Ideally, the worm wheel has a central bore for receiving the shaft of the fastener engaging means.

Ideally, the worm wheel is an annular worm wheel with an internal surface for enclosing the shaft of the fastener engaging means.

Ideally, the worm wheel is operably coupled to the ratchet means.

Preferably, the worm wheel is sandwiched between a pair of internal ratchet gears.

Ideally, the worm wheel is mechanically coupled to the internal ratchet gears via coupling means. Advantageously, rotation of the worm wheel via the motor and worm causes the internal ratchet gears to co-rotate therewith.

Ideally, at least one and preferably both internal ratchet gears are operably coupled to the shaft.

Preferably, at least one of the internal ratchet gears is operably coupled to the shaft via splines.

Preferably, the internal ratchet gears have a central bore for receiving the shaft of the fastener engaging means.

Ideally, the internal ratchet gears are an annular wheel with an internal surface for enclosing the shaft of the fastener engaging means.

Ideally, the internal surface of at least one of the annular internal ratchet gears is formed for engaging the splines of the shaft.

Preferably, the internal ratchet gears have an outer circumferential surface bound by two lateral surfaces.

Ideally, the outside lateral surface of at least one internal ratchet gear has ratchet teeth for operably coupling with an external ratchet gear.

Ideally, the outside lateral surface of the internal ratchet gears have ratchet teeth for operably coupling with external ratchet gears.

Ideally, the high torque low speed drive means comprises a lever ratchet arm having a first end rotatably mounted on the shaft of the fastener engaging means.

Preferably, the high torque low speed drive means comprises a cylinder and piston assembly operably coupled between a second end of or along the length of the lever ratchet arm and the torque wrench head.

Ideally, the lever ratchet arm comprises an elongate lever having a first part operably coupled to the piston and a second bifurcated end, each fork of the bifurcated end having a through bore for receiving the shaft of the fastener engaging means.

Preferably, each fork of the bifurcated end of the lever ratchet arm comprising an external ratchet gear with through bore mounted thereon and being operably couplable to the correspondingly located internal ratchet gear.

Ideally, biasing means are disposed between at least one fork of the bifurcated end of the lever ratchet arm and the corresponding external ratchet gear normally biasing the external ratchet gear towards the mutually opposing internal ratchet gear.

Preferably, biasing means are disposed between both forks of the bifurcated end of the lever ratchet arm and the corresponding external ratchet gear normally biasing the external ratchet gear towards the mutually opposing internal ratchet gear.

Preferably, the external ratchet gears have an outer circumferential surface bound by two lateral surfaces.

Ideally, the inside lateral surface of at least one external ratchet gear has ratchet teeth for operably coupling with an internal ratchet gear.

Ideally, the inside lateral surface of the external ratchet gears have ratchet teeth for operably coupling with internal ratchet gears.

Ideally, the interacting ratchet means of the internal and external ratchet gears are adapted to allow the ratchet means to slip past each other during the high speed low torque phase of the bolt tightening or loosening.

Preferably, means are provided for separating the internal and external ratchet gears as the low power high speed drive means is engaged. Advantageously, the cover prevents wear of the mutually opposing ratchet means on the internal and external ratchet gears.

Ideally, the separating means comprises a manually insertable spacer.

Preferably, the spacer is manufactured from nylon.

Ideally, the ratchet means comprise a plurality of interoperable ratchet teeth on at least one pair of inner and outer ratchet gears and most preferably on both pairs.

Preferably, the interoperable ratchet teeth are on mutually opposing surfaces of the inner and outer ratchet gears.

Ideally, the interoperable ratchet teeth are carried on annular shaped surfaces of the mutually opposing surfaces of the inner and outer ratchet gears.

Preferably, each tooth has a ramp.

Ideally, the ramp is helically swept.

Ideally, each tooth has a lower landing, a ramp and an upper landing.

Preferably, the upright portion between an edge of the upper landing and the lower landing of two adjacent teeth provide the surface of action during the low speed high torque phase of fastener tightening or loosening. By surface of action we mean the surface through which the majority of the torque is transmitted.

Preferably, the dimensions of the teeth on each annulus are selected to correspond to the stroke of the piston of the cylinder and piston assembly.

Ideally, the full stroke of the piston of the cylinder and piston assembly from a fully extended position to a fully withdrawn position and back to a fully extended position causes the interoperable ratchet teeth on at least one outer ratchet gear to move from a position where the surface of action of correspondingly located teeth on mutually opposing surfaces of the inner and outer ratchet gears are in abutment to where these surfaces are pulled apart and the ramps of the teeth on the outer ratchet gear slide up along the ramps of the teeth on the inner ratchet gear until the upper lands of inner and outer ratchet gears pass each other causing the upper lands of the outer ratchet gears to drop onto the and lower lands of the inner ratchet gears wherein the piston is in the fully withdrawn position and wherein extension of the piston causes the surfaces of action to engage and drive the inner ratchet gear through a rotation causing the fastener to be rotated through an angular rotation thereby applying a make up or break out torque to the fastener.

Ideally, the number of teeth of the inner and outer ratchet gears in combination with the stroke of the piston determines the angular rotation each piston stroke applies.

In the present invention, the stroke of the piston is capable of causing one surface of action to travel from an abutting relationship with a surface of action of one mutually opposing tooth up along the ramp and into abutment with the surface of action of the adjacent tooth. Advantageously, this allows the outer ratchet gear of the present invention to take one bite at a time out of the inner ratchet gear. Further advantageously, this allows an operator to know that the piston and cylinder assembly has reached the actual force value at the end of the stroke which the piston and cylinder assembly is calibrated to achieve. This allows more accurate measurement of the torque applied to the fastener.

In one embodiment, the inner and outer ratchet gears have 12 teeth each. This means that each stroke of the piston will cause an angular rotation of 30 degrees.

It will of course be appreciated that the stroke of the piston will have a small travel in reserve for overrun and a home position.

Ideally, the exemplary stroke of one piston is 130 mm.

Preferably, the cylinder of the piston and cylinder assembly has position sensing means for detecting the position of the stroke of the cylinder. Advantageously, as the cylinder extends, the moment force varies due to the geometry of the tool therefore the force the cylinder exerts on the moment arm varies depending on the linear position of the cylinder. This means that an exact reading of torque applied to the fastener at any stage of the cylinder stroke could be measured based on the position.

Ideally, the two pairs of ratchet gears on opposing sides of the worm wheel are handed.

Ideally, the fastener engaging means has a longitudinal axis corresponding with the axis of rotation of the fastener engaging means.

Preferably, the axis of rotation of the worm of the low power high speed drive means extends perpendicular to the axis of rotation of the fastener engaging means.

Ideally, the worm engages the worm gear tangentially driving the fastener engaging means in the one direction.

Preferably, the orientation of the axis of rotation of the worm and the axis of rotation of the fastener engaging means are fixed relative to one another.

Ideally, the cylinder arrangement of the high torque low speed drive means has a longitudinal axis corresponding to the axis of the stroke of the piston rod.

Preferably, the axis of stroke of the piston rod is perpendicular to the axis of rotation of the fastener engaging means.

Ideally, the axis of rotation of the rotational coupling arrangement coupling the torque wrench head to the mounting means is perpendicular to the axis of the stroke of the piston rod.

Preferably, the axis of rotation of the rotational coupling arrangement coupling the torque wrench head to the mounting means is perpendicular to the axis of rotation of the fastener engaging means.

Ideally, the axis of rotation of the rotational coupling arrangement coupling the torque wrench head to the mounting means intersects the axis of rotation of the fastener engaging means.

Ideally, the axis of rotation of the rotational coupling arrangement coupling the torque wrench head to the mounting means intersects the axis of rotation of the worm.

Preferably, the axis of rotation of the rotational coupling arrangement coupling the torque wrench head to the mounting means intersects the axis of stroke of the piston rod.

Advantageously, the alignment of the axis of rotation of the rotational coupling assembly with each of the axis of rotation of the worm and the axis of stroke of the piston rod means that rotation of these components through 180 degrees about the axis of rotation of the rotational coupling arrangement causes the worm and the piston to rotate the fastener engaging means in the opposite direction. In other words, when the torque wrench head is in a first position the fastener engaging means rotates clockwise and when the torque wrench head is rotated through 180 degrees about the swivel joint assembly, the fastener engaging means rotates in an anti-clockwise direction. This is what allows the torque wrench assembly to provide break out and make up of the fastener without stripping down the tool.

Preferably, the axis of the stroke of the piston rod and the worm gear are coplanar.

Ideally, the axis of the stroke of the piston rod and a symmetrical radial plane of the worm gear are coplanar. By symmetrical radial plane we mean a plane which would divide the worm gear into two symmetrical halves in a plane perpendicular to the longitudinal axis of the fastener engaging means.

Ideally, the worm gear is centrally mounted on the fastener engaging means.

Preferably, the inner ratchet gears, the outer ratchet gears and the bifurcated end of the lever ratchet arm are symmetrically mounted on the fastener engaging means about the worm gear. Advantageously, the central mounting of the worm gear on the shaft of the fastener engaging means in combination with the planar alignment of the stroke axis of the piston rod and the worm gear as well as the symmetrical mounting of the inner ratchet gears, the outer ratchet gears and the bifurcated end of the lever ratchet arm about the worm gear means that the maximum amount of force generated by the cylinder and piston assembly is transferred into torque via the lever ratchet arm and is uniformly distributed onto the shaft of the fastener engaging means for both clockwise and anticlockwise rotation. This means that the transfer of force from the cylinder to the fastener is efficient with minimum loss of energy through twisting of the torque wrench assembly as a result of misalignment of the forces.

Ideally, the torque wrench head has a main body formed for receiving the fastener engaging means, the cylinder assembly and the worm.

Preferably, the main body of the torque wrench head has a first collar for receiving the fastener engaging means and a second collar for receiving the cylinder assembly, the collars being arranged so that the axis of rotation of the fastener engaging means and the axis of the stroke of the cylinder are perpendicular.

Ideally, the collar for receiving the fastener engaging means having a bearing housing to facilitate rotation of the journalled portion of the main body.

Ideally, the gears and ratchet arm are held in position on the shaft via stop means preventing the components moving longitudinally along the shaft.

Ideally, a support frame for locating and retaining the worm is integrally formed with the main body.

Preferably, the collar for receiving the fastener engaging means has a support frame for locating and retaining the worm thereon.

Ideally, the support frame for locating and retaining the worm is integrally formed with the main body.

Ideally, the collar for receiving the fastener engaging means has a cutaway portion for allowing the worm to engage with the worm gear.

Preferably, the main body of the torque wrench head has means for operably coupling the main body to the mounting means.

Ideally, the means for operably coupling the main body to the mounting means is a rotational coupling means and most preferably a pivotal coupling means.

Preferably, the means for operably coupling the main body to the mounting means is a trunnion.

Preferably, the means for operably coupling the main body to the pivotal coupling arrangement allows the toque wrench head to rotate relative to the mounting means between a fastener make up and fastener break out position.

Ideally, the torque wrench assembly further comprising means for mounting the torque wrench assembly on a support means comprising a flange. Drilling equipment consists of a series of riser sections joined together in a string and lowered onto a drilled well. Each joint of riser is joined together using flanges. Each riser flange has either 6 or 8 fastener assemblies depending on the model or design criteria. Some riser flanges have fasteners on two separate pitch circle diameters PCD. The riser sections are joined by flanges on the end of the riser sections. The fastener assemblies have bores on each flange which are aligned in use. The bottom bore houses a threaded nut for retaining the threaded fastener. The flanges are mechanically coupled by hydraulic torque wrench assemblies driving threaded fasteners into the aligned bores for mechanically coupling the flanges together.

Preferably, the mounting means is formed for mounting the torque wrench assembly on at least one of the flanges being coupled together.

Ideally, the mounting means is formed for mounting the torque wrench assembly on an upper flange of a pair of flanges to be coupled together.

Ideally, the mounting means comprises a multi-part collar.

Preferably, the multi-part collar comprises a plurality of arcuate components.

Ideally, at least two of the arcuate components are pivotally coupled together.

Preferably, the collar is formed for enclosing the external surface of the flange with releasable locking means for securely locking the collar in position.

Preferably, a clamp, most preferably a toggle clamp provides the releasable locking means for locking the collar onto the flange.

Ideally, the collar has locating means for locating the collar on the flange.

Preferably, the flange has a plurality of fixed locating means.

Ideally, the fixed locating means of the flanges comprise pipes protruding longitudinally out of the main plane of the flange, generally substantially perpendicular to the main plane of the flange. The primary purpose of these pipes is to provide a conduit for communication to subsea equipment but because their position is standard they can be utilized to locate the collar.

Ideally, the locating means of the collar are formed for engagement with the fixed locating means of the flange.

Preferably, the locating means of the collar are fixed relative to the through bores of the flange.

Ideally, the flange locating means of the collar are located on the internal circumference of the collar.

Preferably, the flange locating means of the collar comprise female locating means for receiving the fixed locating means of the flange.

Mounting means leg, foot and interlocking slots on collar.

Ideally, the mounting means comprises a spacer means for coupling the mounting means to the collar.

Preferably, the spacer means is a leg.

Ideally, the spacer means is a structural support beam.

Preferably, the spacer means comprises a reaction arm.

Preferably, the reaction arm and the collar have correspondingly located male and female engaging means for releasably interlocking these components together.

Ideally, one end of the reaction arm has a male engaging means for engaging with a plurality of female locating members on the circumference of the collar, most preferably on the external circumference of the collar.

Ideally, the male engaging means and the female locating members are formed for releasable interlocking for preventing axial and/or radial movement or twisting of the torque wrench head relative to the fastener by reacting against torque generated by the piston stroke.

Ideally, the female locating means comprise a plurality of slots tapering from a base to an opening in the circumference of the collar.

Preferably, the slots are trapezoidal.

Ideally, the male engaging means comprises a foot protruding from the bottom of the reaction arm.

Preferably, the reaction foot has a trapezoidal form for preventing radial or lateral or twisting movement of the torque wrench head relative to the fastener by reacting against torque generated by the piston stroke.

Preferably, one end of the reaction arm has a reaction foot for engaging with a plurality of female locating members on the external circumference of the collar.

Ideally, the locating means on the collar for locating the reaction arm are provided proximal to the through bores of the flange. Advantageously, the position of the collar relative to the fixed locating means of the flange is known and the position of the through bores of the flanges relative to the fixed locating means is known. This allows the position of the reaction arm locating means of the collar to be designed into the collar.

Preferably, the reaction arm locating means of the collar comprises two locating means, most preferably slots, for each flange through bore. Advantageously, this provides a locating means for the make up and break out of the same fastener.

Ideally, the locating means on the collar for locating the reaction arm are positioned so that the torque wrench head do not engage any of the pipes on the flange during operation of the torque wrench head.

Ideally, the other end of the reaction arm carries a part of the rotational coupling arrangement.

Preferably, the mounting means has a means for coupling external lifting gear.

Ideally, the coupling means for external lifting gear is located at or about the centre of gravity of the torque wrench assembly. Advantageously, this prevents the torque wrench assembly from swinging around when lifted by external lifting gear. This reduces the risk to the operators and the time for the torque wrench assembly to settle into a working position when being moved or craned into position.

Ideally, one or both ends of the shaft is splined for operably coupling with one or more socket heads. Advantageously, a range of socket heads can be mounted on one or both ends of the shaft.

Ideally, the torque wrench assembly has a control system for controlling fastener make up and break out.

Ideally, the control system has a fluid circuit for controlling the low speed high torque drive means and the high speed low torque drive means which are operable on the one fluid circuit.

Ideally, the circuit is a hydraulic circuit.

Preferably, the control system has sensor means for detecting a predetermined fluid pressure.

Ideally, the fluid circuit has sensor means for detecting a predetermined fluid pressure.

Preferably, the control system has switching means for detecting a predetermined fluid pressure.

Ideally, the fluid circuit has switching means for detecting a predetermined fluid pressure.

Preferably, the switching means is capable of switching the fluid circuit from the high speed low torque drive means to the low speed high torque drive means.

Ideally, the control system is operable for monitoring fluid pressure from the sensor means and operable for switching the fluid circuit between the high speed low torque drive means and the low speed high torque drive means.

Ideally, during break out where the fastener is suddenly loosened, the control system has means for detecting rapid drop in hydraulic pressure and switching to the high speed low torque drive means.

Ideally, the switching means switches the drive circuit from the high speed low torque drive means to the low speed high torque drive means at a fluid pressure up to and including 150 bar and most preferably, at a fluid pressure up to and including 25 bar.

Ideally, the switching means switches the drive circuit from the low speed high torque drive means to the high speed low torque drive means at a fluid pressure up to and including 150 bar. One particular hydraulic motor has a maximum working pressure of 150 bar and the designed operating pressure will be set at 25 bar in order to achieve a constant speed.

Ideally, the cylinder and piston assembly has a position detector for detecting the travel position of the piston rod or piston.

Preferably, the cylinder and piston assembly have a pressure sensor for measuring the fluid pressure acting on the piston.

Ideally, the torque wrench assembly has a system for measuring and recording torque applied to a fastener.

Ideally, the control system has electronic control means operably couplable to one or all or any combination of the torque recording system, the pressure sensor, the cylinder positioning means and the hydraulic circuit switching control.

Preferably, the electronic control means comprises any one of or any combination of PLC control systems, microprocessors, microcontrollers, asics and/or other suitable computer means.

Preferably, the measuring and recording system for measuring a torque being applied to a fastener comprises a means for measuring torque.

Ideally, the means for measuring torque comprises a torque sensor.

Accordingly, the present invention provides a system for measuring, recording and storing make up torque values for fasteners during the mechanical coupling of flanges of adjacent risers together prior to lowering into the sea, the system comprising means for measuring, recording and storing an actual make up torque value being measured from a hydraulic torque wrench in real time.

Ideally, the measuring, recording and storing system comprises an electronic system.

Ideally, the measuring, recording and storing system further comprising means for measuring, recording and storing identification means of the hydraulic torque wrench assembly.

Preferably, the measuring, recording and storing system further comprising means for measuring, recording and storing identification means of the operative using the assembly at the time the torque value is measured.

Ideally, the measuring, recording and storing system further comprises means for measuring, recording and storing the details of the specific fastener being made up. It will also be possible to record all fasteners of a particular flange.

Advantageously, this measuring, recording and storing system allows drilling equipment operators to store actual values of torque reached at the make up point as well as details of the actual hydraulic torque wrench assembly which applied the torque and the operative who was using the assembly at the time this torque value was applied. This system provides a major benefit for the off shore drilling equipment operators' compliance requirements. In the event of a disaster where flanges fail and oil leaks occur, the exact hydraulic torque wrench assembly as well as the torque applied to specific fasteners of each flange can be traced back electronically which will be a significant improvement for the industry in terms of investigation times and liability as well as for insurance reasons.

Ideally, the hydraulic torque wrench assembly has a control system for controlling fastener make up and break out.

Preferably, the measuring, recording and storing system is operably couplable with the control system of the hydraulic torque wrench assembly.

Ideally, the control system has a fluid circuit for controlling the low speed high torque drive means and the high speed low torque drive means which are operable on the one fluid circuit.

Ideally, the circuit is a hydraulic circuit.

Preferably, the control system has sensor means for detecting a predetermined fluid pressure.

Ideally, the fluid circuit has sensor means for detecting a predetermined fluid pressure.

Preferably, the control system has switching means for detecting a predetermined fluid pressure.

Ideally, the fluid circuit has switching means for detecting a predetermined fluid pressure.

Preferably, the switching means is capable of switching the fluid circuit from the high speed low torque drive means to the low speed high torque drive means.

Ideally, the control system is operable for monitoring fluid pressure from the sensor means and operable for switching the fluid circuit between the high speed low torque drive means and the low speed high torque drive means.

Ideally, during break out where the fastener is suddenly loosened, the control system has means for detecting rapid drop in hydraulic pressure and switching to the high speed low torque drive means.

Ideally, the switching means switches the drive circuit from the high speed low torque drive means to the low speed high torque drive means at a fluid pressure up to and including 150 bar and most preferably, at a fluid pressure up to and including 25 bar.

Ideally, the switching means switches the drive circuit from the low speed high torque drive means to the high speed low torque drive means at a fluid pressure up to and including 150 bar.

Ideally, the cylinder and piston assembly has a position detector for detecting the travel position of the piston rod or piston.

Preferably, the cylinder and piston assembly have a pressure sensor for measuring the fluid pressure acting on the piston.

Ideally, the torque wrench assembly has a system for measuring and recording torque applied to a fastener.

Ideally, the control system has electronic control means operably couplable to one or all or any combination of the torque recording system, the pressure sensor, the cylinder positioning means and the hydraulic circuit switching control.

Preferably, the electronic control means comprises any one of or any combination of PLC control systems, microprocessors, microcontrollers, asics and/or other suitable computer means.

Preferably, the measuring and recording system for measuring a torque being applied to a fastener comprises a means for measuring torque.

Ideally, the means for measuring torque comprises a torque sensor.

Ideally, the measuring, recording and storing system has electronic storage means operably couplable to the control system for the torque wrench assembly.

Preferably, the electronic storage means comprises by way of illustration, and not limitation, non-volatile and volatile memory.

Preferably, non-volatile memory can include read only memory (ROM), programmable ROM (PROM), electrically programmable ROM (EPROM), electrically erasable ROM (EEPROM), or flash memory.

Ideally, volatile memory includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), and direct Rambus RAM (DRRAM).

Accordingly, the present invention provides a torque wrench assembly comprising a torque wrench head being adapted to both tighten and loosen a fastener, the torque wrench head comprising fastener engaging means and drive means for driving the fastener engaging means;

the drive means comprises a low torque high speed drive means and a high torque low speed drive means;

the torque wrench assembly having a ratchet means;

the ratchet means being operably coupled to the fastener engaging means;

the low speed high torque drive means and the high speed low torque drive means being operably coupled via the ratchet means;

at least part of the low torque high speed drive means being mounted on the fastener engaging means;

at least part of the ratchet means being symmetrically mounted on the fastener engaging means about the part of the low torque high speed drive means mounted on the fastener engaging means.

Ideally, the torque wrench assembly further comprising means for mounting the torque wrench assembly on a support means.

Ideally, at least one part of the high torque low speed drive means being symmetrically mounted on the fastener engaging means about the part of the low torque high speed drive means mounted on the fastener engaging means.

Advantageously, the central mounting of part of the high speed low torque drive means on the fastener engaging means with at least part of the low speed high torque drive means being symmetrically mounted about the high speed low torque drive means results in the maximum amount of force generated by the low speed high torque drive means being transferred into torque via the symmetrically mounted ratchet means which is uniformly distributed onto the fastener engaging means for both clockwise and anticlockwise rotation. This means that the transfer of force from the low speed high torque drive means to a fastener is efficient with minimum loss of energy through twisting of the torque wrench assembly as a result of misalignment of the forces.

It will of course be appreciated that all of the statement of inventions commencing with the optional phrase ideally or preferably from page 2 to page 20 may be individually or in any combination appended to this further statement of invention to further define this statement of invention.

Ideally, the torque wrench assembly is of the type described above in the main statement of invention to the torque wrench assembly and covers any of the ideally or preferably fall back positions.

BRIEF DESCRIPTION OF THE DRAWINGS

The invention will now be described with reference to the accompanying drawings which show by way of example only one embodiment of an apparatus in accordance with the invention. In the drawings.

DETAILED DESCRIPTION OF THE INVENTION

Figure 1:
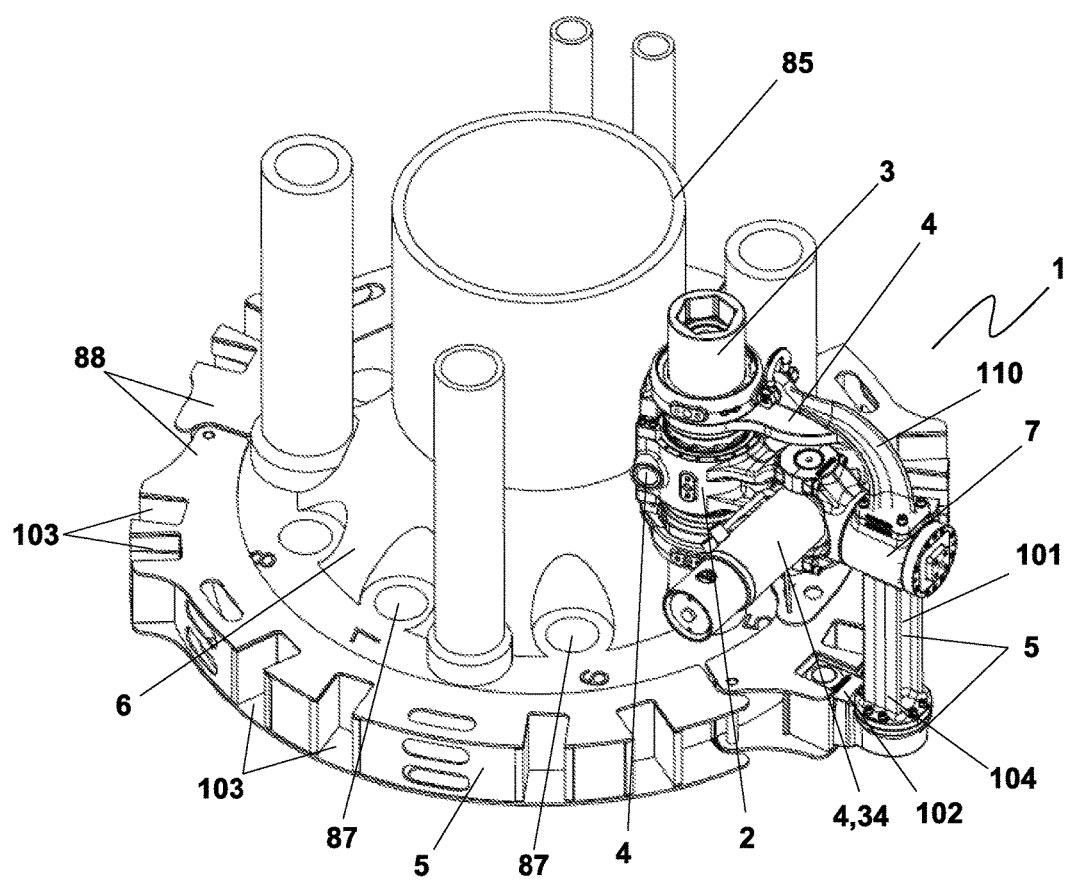
FIG. 1 is a perspective view of the torque wrench assembly mounted in position on a flange of a riser section with pipes cutaway.
Figure 2:
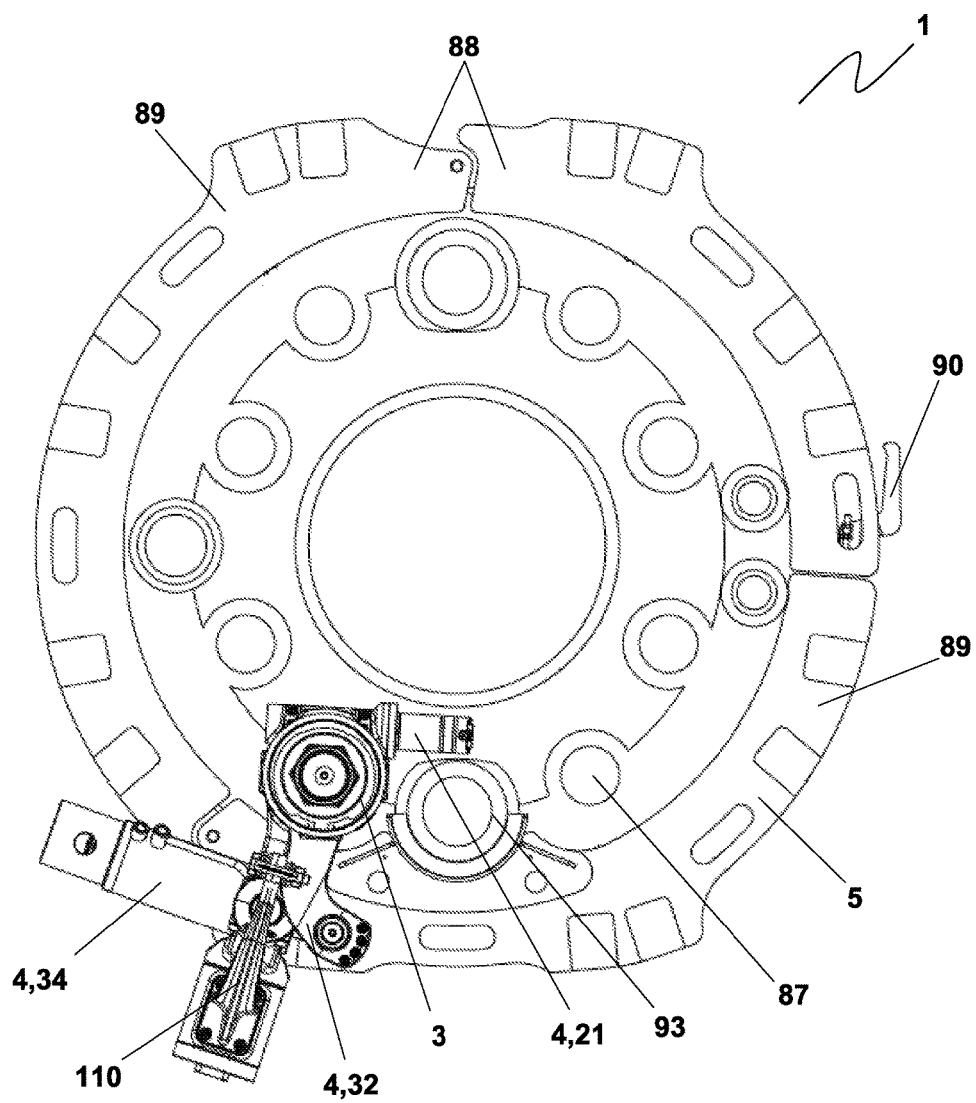
FIG. 2 is a plan view of FIG. 1.

In the drawings, there is shown a torque wrench assembly indicated generally by the reference numeral 1. The torque wrench assembly 1 has a torque wrench head 2 being adapted to both tighten and loosen a fastener. The torque wrench head 2 has a fastener engaging arrangement 3 and a drive arrangement 4 for driving the fastener engaging arrangement 3. The torque wrench assembly 1 also has an assembly 5 for mounting the torque wrench assembly 1 on a support 6. The torque wrench head 2 is movably mounted on the mounting assembly 5 so that the torque wrench head 2 is capable of both tightening a fastener and loosening the same fastener by moving the torque wrench head 2 relative to the mounting assembly 5 between a fastener tightening position and a fastener loosening position.

Advantageously, the torque wrench assembly 1 of the present invention does not require any modifications to the physical components of the torque wrench assembly 1 to allow a fastener to be both tightened and loosened other than simply moving the torque wrench head 2 relative to the mounting assembly 5. The torque wrench head 2 is rotatably mounted on the mounting assembly 5 and in the embodiment illustrates is pivotally coupled on the mounting assembly 5. The torque wrench head 2 is rotatably coupled to the mounting assembly via a pivotal coupling arrangement 7. The torque wrench head 2 is free to rotate relative to the mounting assembly 5 in a clockwise or anticlockwise direction. The torque wrench head 2 can rotate through 180 degrees relative to the mounting assembly 5. The torque wrench head 2 can rotate through 180 degrees relative to the mounting assembly 5 between a fastener loosening position and a fastener tightening position.

Figure 22:
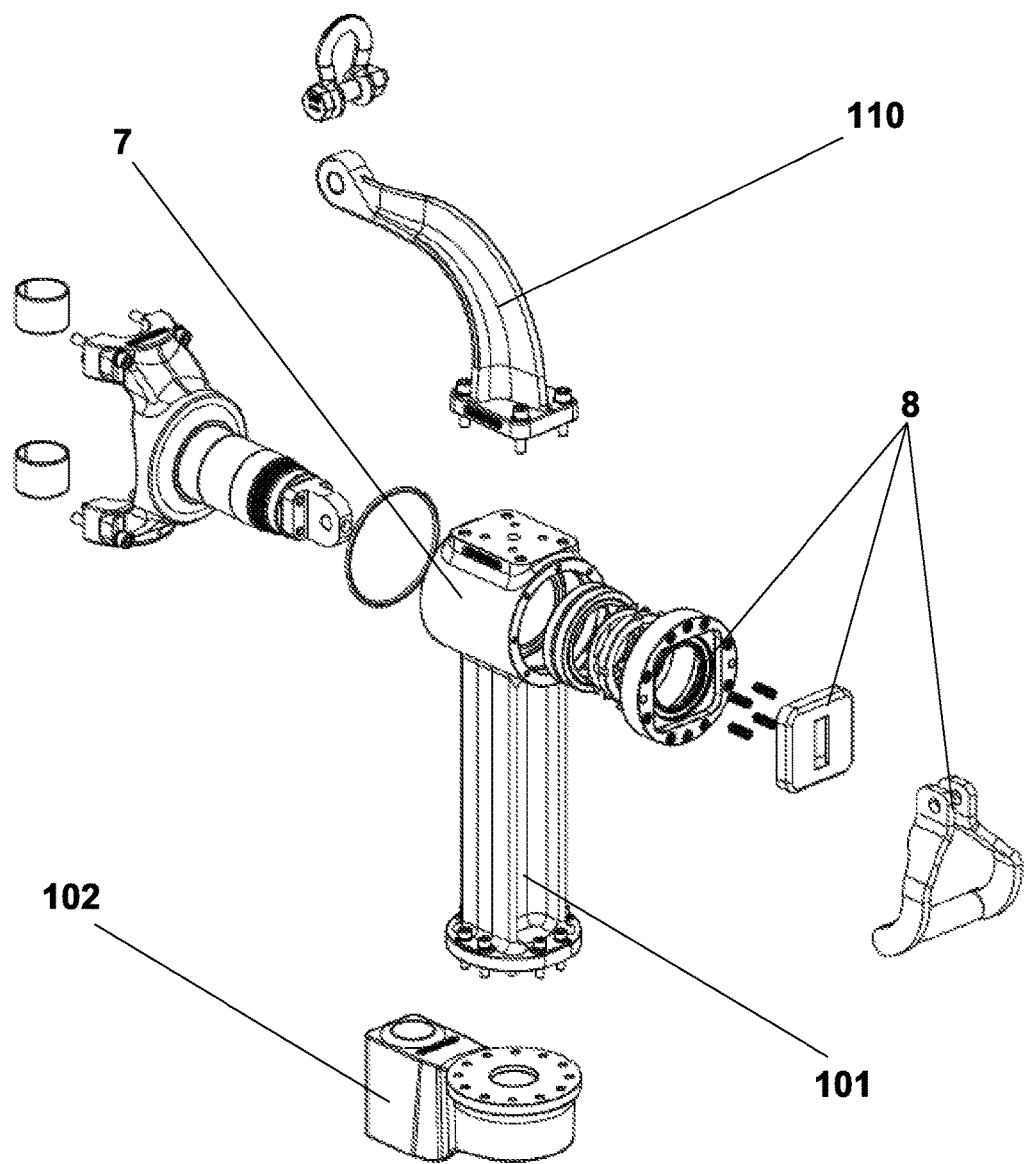
FIG. 22 is a perspective view of part of the mounting assembly showing a lock.

A locking arrangement 8 (e.g., see FIG. 22) is provided between the torque wrench head 2 and the mounting assembly 5. The locking arrangement 8 locks the torque wrench head 2 and the mounting assembly 5 together so no relative movement is possible in at least a fastener loosening position and a fastener tightening position.

Figure 9:
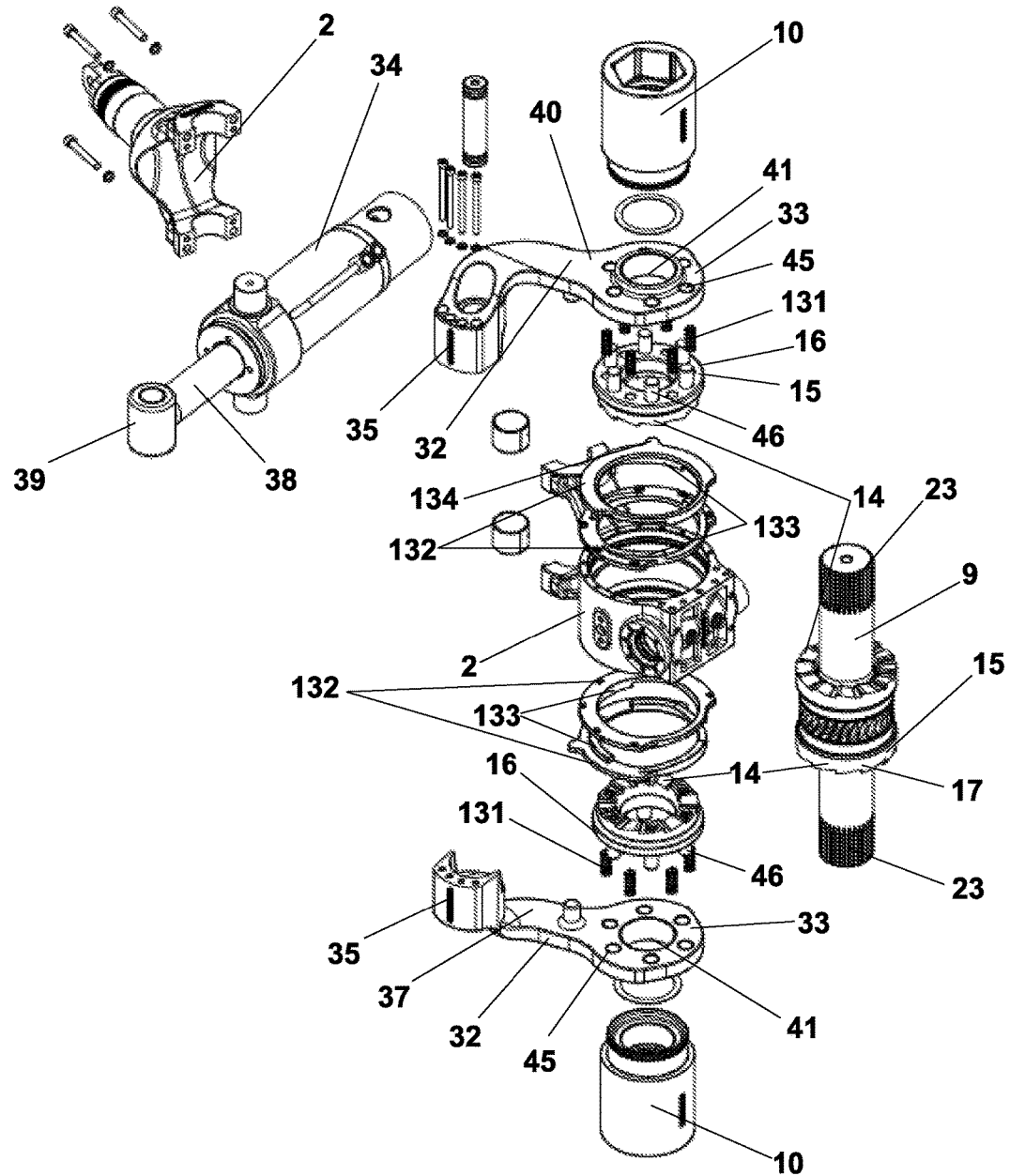
FIG. 9 is an exploded perspective view of the torque wrench head and rotational coupling.
Figure 10:
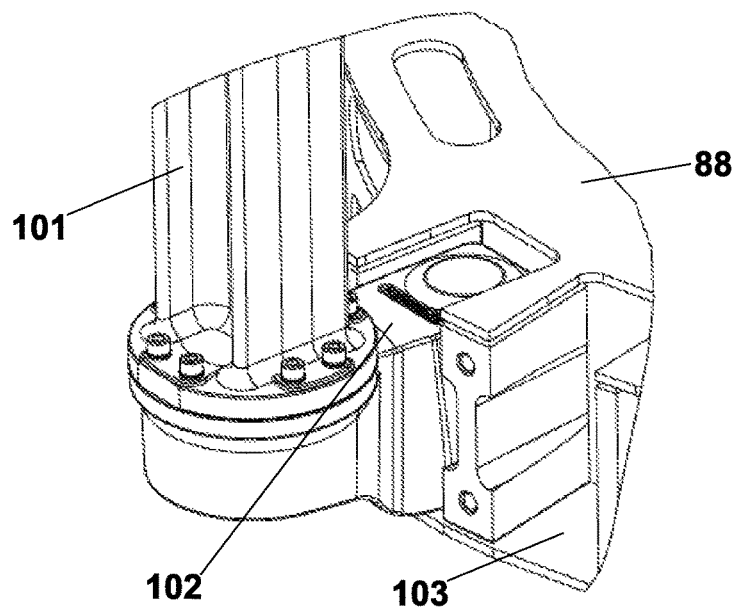
FIG. 10 is a detail view of the flange mountable collar and foot of the mounting arrangement.
Figure 11:
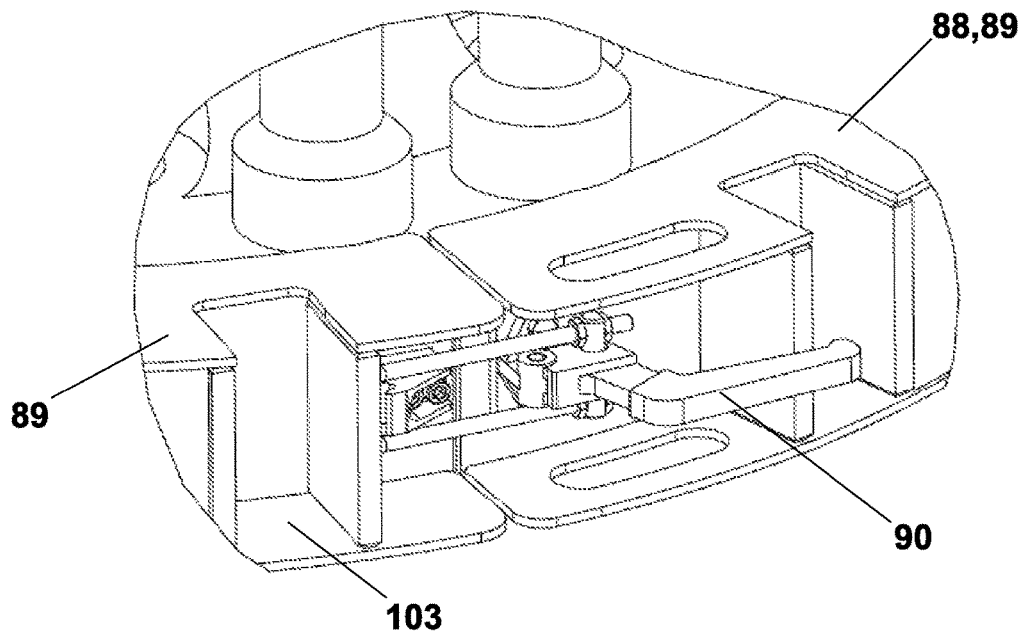
FIG. 11 is a detail view of the clamp of the flange mountable collar.
Figure 12:
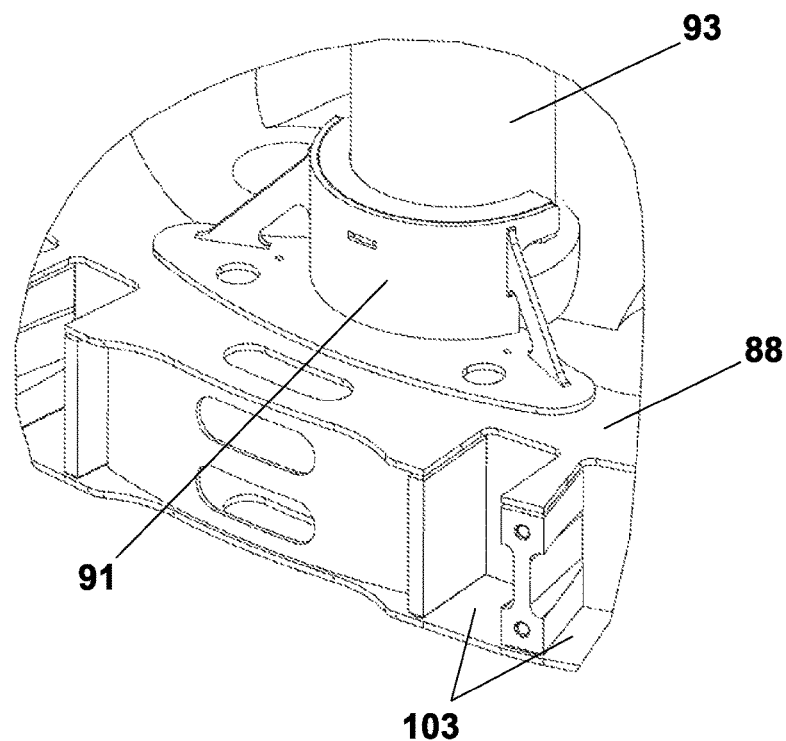
FIG. 12 is a detail view of the reinforcement of the locating arrangement of the flange mountable collar.
Figure 13:
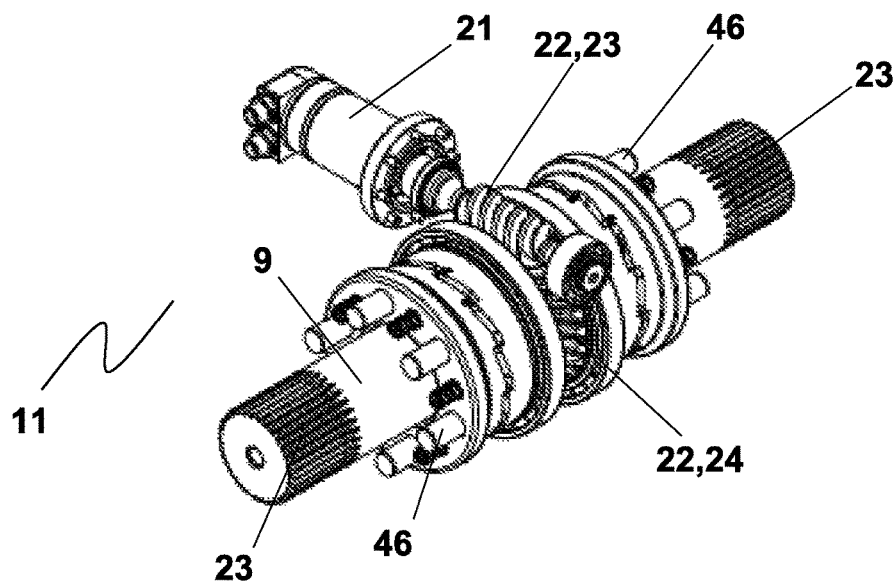
FIG. 13 is a perspective view of the drive assemblies of the fastener engaging shaft.

The fastener engaging arrangement 3 has a shaft 9 (e.g., see FIG. 9) being adapted for coupling a socket 10 at each end. The drive arrangement 4 has a low torque high speed drive arrangement indicated generally by the reference numeral 11 (e.g., see FIG. 13) described in further detail below. Advantageously, this low torque high speed drive arrangement allows an operator to run the threaded fastener quickly towards or away from a fastener housing 6 such as a flange 6. The drive arrangement 4 also has a low speed high torque drive arrangement indicated generally by the reference numeral 12 (e.g., see FIGS. 5-8) described in further detail below. Advantageously, this low speed high torque drive arrangement 12 allows an operator to make up the fastener to the recommended torque value to meet the relevant specification and to break out the fastener for removal or replacement. The low speed high torque drive arrangement 12 can generate a range of recommended torque values. The recommended torque value is in the range of 500 lb/ft to 3000 lb/ft, most preferably the range being 800 lb/ft to 1400 lb/ft with the most preferred setting being 1260 lb/ft. The torque wrench assembly 1 has a ratchet arrangement 14 (e.g., see FIGS. 9 and 14-19). The ratchet arrangement 14 is operably coupled to the fastener engaging arrangement 3. The low speed high torque drive arrangement 12 and the high speed low torque drive arrangement 11 are operably coupled via the ratchet arrangement 14.

In use, the ratchet arrangement 14 is adapted so as to allow the high speed low torque drive arrangement 11 to operate independently of the low speed high torque drive arrangement 12 with the ratchet arrangement 14 disengaged. The ratchet arrangement 14 is adapted so as to allow the low speed high torque drive arrangement 12 to engage the high speed low torque drive arrangement 11 when rotating the fastener into the final position at the predetermined torque setting.

The ratchet arrangement 14 has tubular members 15 formed for enclosing the shaft 9 of the fastener engaging arrangement 3. The ratchet arrangement 14 has annular members 15 formed for enclosing the shaft 9 of the fastener engaging arrangement 3. At least part of the ratchet arrangement 14 is operably coupled to the shaft 9 of the fastener engaging arrangement 3 via splines on the shaft 9. The ratchet arrangement 14 has a pair of outer ratchet members 16 and a pair of inner ratchet members 17. The outer ratchet members 16 are free to rotate on the shaft 9 and the inner ratchet members 17 are coupled to the shaft 9 via splines.

Referring to the drawings, and now in particular to FIGS. 9 and 13-19, the high speed low torque drive arrangement 11 has a hydraulic motor 21 and a gear arrangement 22 operably coupling the motor 21 to the fastener engaging arrangement 3. The fastener engaging arrangement 3 has an elongate shaft 9. The shaft 9 has an adaption 23 in the form of longitudinal splines 23 for coupling the sockets 10 on each end of the shaft 9.

The shaft 9 has sockets 10 on each end thereof in coaxial alignment therewith facing away from each other. The elongate shaft 9 is cylindrical. The motor 21 is operably coupled to a worm gear assembly 22 for rotating the fastener engaging arrangement 3. The worm gear assembly 22 has a worm 23 and a worm wheel 24. The worm wheel 24 has a central bore 25 (e.g., see FIG. 18) for receiving the shaft 9. The worm wheel 24 is an annular worm wheel 24 with an internal surface 26 for enclosing the shaft 9. The worm wheel 24 is operably coupled to the ratchet arrangement 14. The worm wheel 24 is sandwiched between a pair of internal ratchet gears 17. The worm wheel 24 is mechanically coupled to the internal ratchet gears 17 via mechanical coupling members 25. Advantageously, rotation of the worm wheel 24 via the motor 21 and worm 23 causes the internal ratchet gears 17 to co-rotate therewith. The internal ratchet gears 17 are operably coupled to the shaft 9 via splines. The internal ratchet gears 17 have a central bore 27 for receiving the shaft 9 of the fastener engaging arrangement 3. The internal ratchet gears 17 are annular wheel 17 with an internal surface 28 for enclosing the shaft 9. The internal surface 28 of the annular internal ratchet gears 17 is formed for engaging the splines of the shaft 9.

Figure 18:
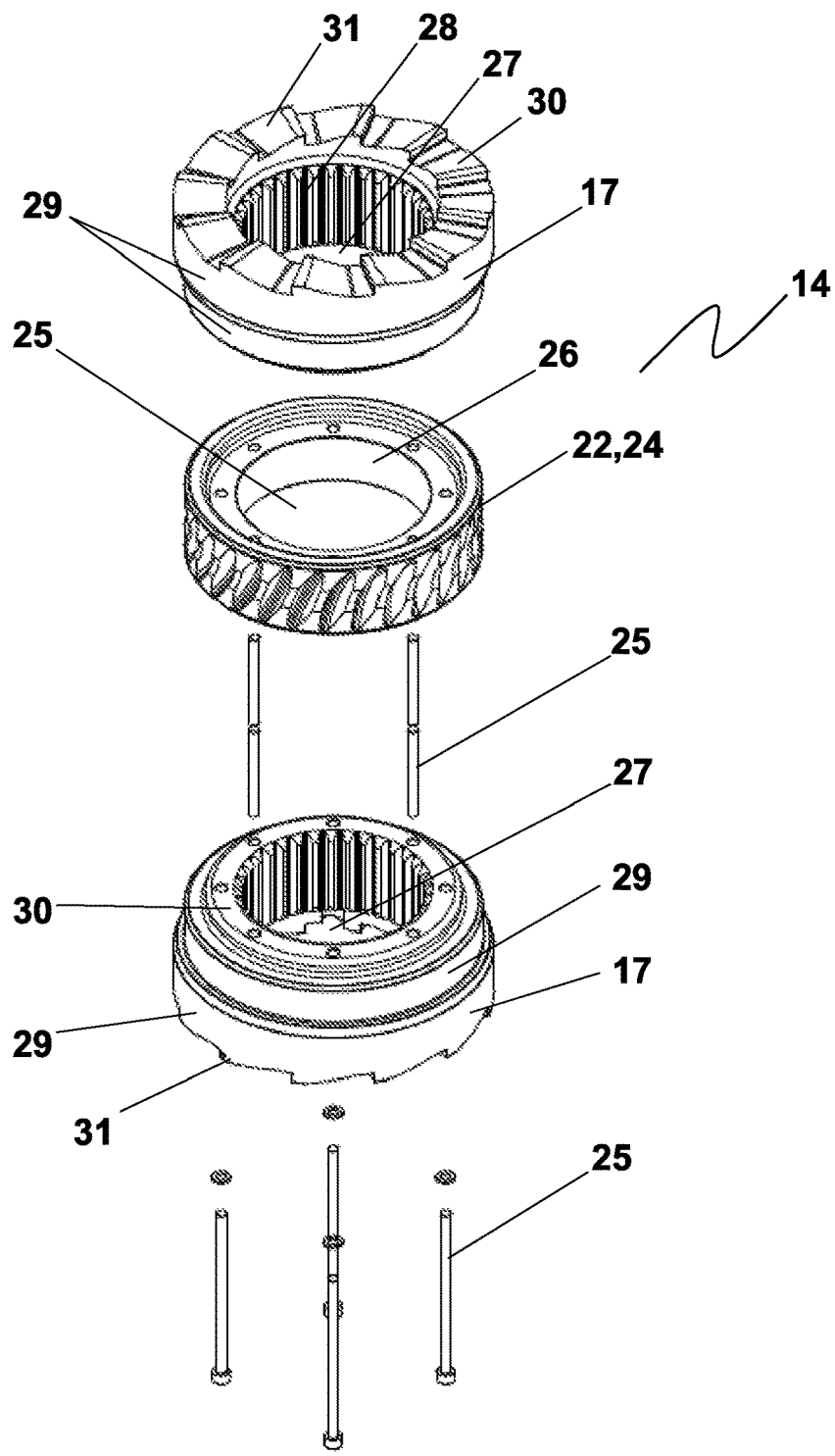
FIG. 18 is an exploded perspective view of the worm wheel and the two internal ratchet gears and their mechanical fasteners.
Figure 19:
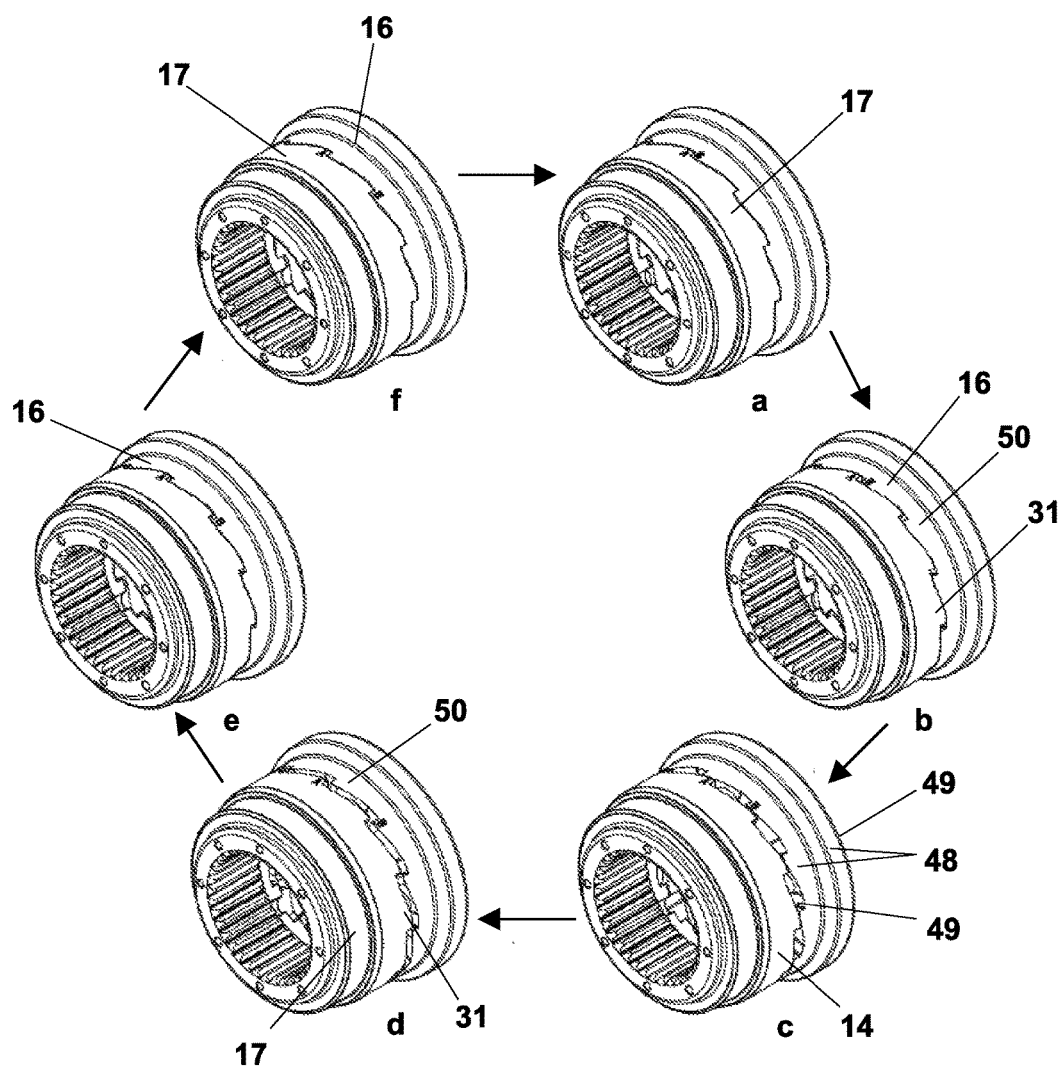
FIG. 19 illustrates a series of six positions of mutually opposing sets of ratchet teeth showing the one bite at a time principle on which the present ratchet mechanism operates to make up or break out the fastener during the high torque phase.

The internal ratchet gears 17 have two outer circumferential surfaces 29 bound by two outside lateral surfaces 30 (e.g., see especially FIG. 18). The outside lateral surface 30 of the internal ratchet gears 17 have ratchet teeth 31 for operably coupling with an external ratchet gear 16, described in greater detail below.

Referring to the drawings, and more specifically with reference to FIGS. 5-9 and 13-19, the high torque low speed drive arrangement 12 has a lever ratchet arm 32 having a first end 33 rotatably mounted on the shaft 9 of the fastener engaging arrangement 3. The high torque low speed drive arrangement 12 has a cylinder and piston assembly 34 operably coupled between a second end 35 of the lever ratchet arm 32 and the torque wrench head 2. The lever ratchet arm 32 has two elongate levers 37 having one end 35 operably coupled to the piston rod 38 via shaft 39 and a bifurcated end 33, each fork 40 of the bifurcated end 33 having a through bore 41 for receiving the shaft 9 of the fastener engaging arrangement 3. The lever ratchet arm 32 is a two piece component separable and joinable for ease of assembly (e.g., see FIG. 9).

Each fork 40 of the bifurcated end 33 of the lever ratchet arm 32 carries an external ratchet gear 16 with through bore mounted thereon and being operably coupled to the correspondingly located internal ratchet gear 17. The bifurcated ends 33 of the lever ratchet arm 32 and the outer radial surface of the external ratchet gears 16 have bores 45 for receiving correspondingly located dowels 46 for fixing the bifurcated ends 33 of the lever ratchet arm 32 and the external ratchet gears 16 together (e.g., see especially FIG. 9). A biasing arrangement 131 is disposed between the fork 40 of the bifurcated end 33 of the lever ratchet arm 32 and the corresponding external ratchet gear 16 normally biasing the external ratchet gear 16 towards the mutually opposing internal ratchet gears 17. In use, the biasing arrangement 131 comprises a number of springs 131. The springs 131 are used to ensure external ratchet gear 16 and internal ratchet gear 17 remain fully engaged at all times. The external ratchet gears 16 have two outer circumferential surfaces 48 bound by two outer lateral surfaces 49. The inside lateral surface 49 of the external ratchet gear 16 has ratchet teeth 50 for operably coupling with the ratchet teeth 31 of the internal ratchet gears 19. The interacting ratchet teeth 31, 50 of the internal and external ratchet gears 17, 16 are adapted to allow the ratchet arrangement 16, 17 to slip past each other during the high speed low torque phase of the bolt tightening or loosening.

A cover 132 is provided for separating the internal and external ratchet gears 17, 16 as the low power high speed drive means is engaged. Advantageously, the cover 132 prevents wear of the mutually opposing ratchet teeth on the internal and external ratchet gears 17, 16. The cover 132 is provided by a manually operable two part collar 132 and can be manufactured from nylon or some similar resilient material to prevent teeth chattering. The two part collars have mutually opposing swept cam profiles 133 on annular surfaces of the two parts of the collar 132. In use an operator would rotate the top nylon collar 132 using a thumb feature 134, causing it to move in an upwards direction when it rides up on the swept cam profiles 133. This collar would hold the external ratchet gear 16 up off the internal ratchet gear 17, thus preventing any teeth meshing/clattering. When the hydraulic cylinder starts, a spigot disengages the nylon collar 132 forcing it to return to its closed/lower position, thus allowing the external ratchet gear 16 free to move down and engage the internal ratchet gear 17. The nylon collar 132 would be assisted via biasing means to return to a home position. The collar 132 has a feature to releasably fix it in the up position.

Figure 14:
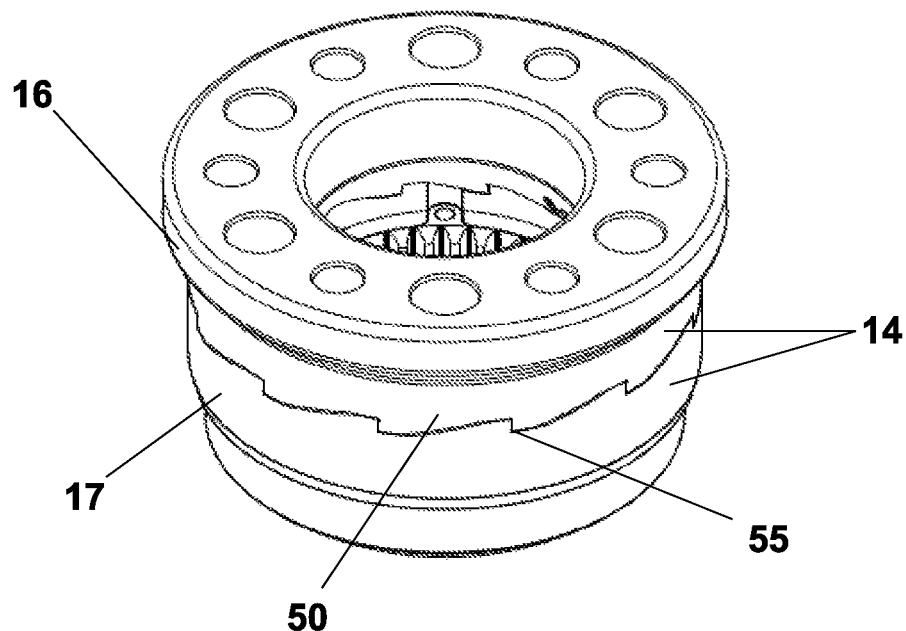
FIG. 14 is a perspective view of one pair of ratchet gears.
Figure 15:
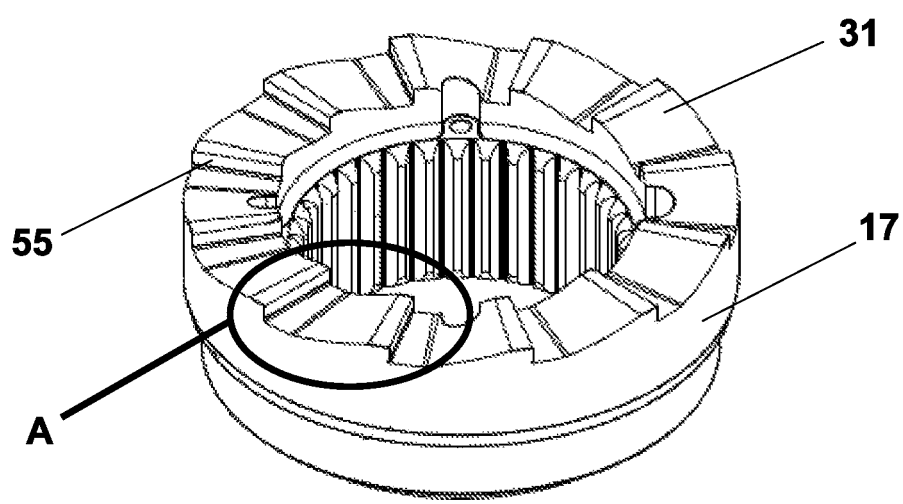
FIG. 15 is a perspective view of the teeth of one of the internal ratchet gears.
Figure 16:
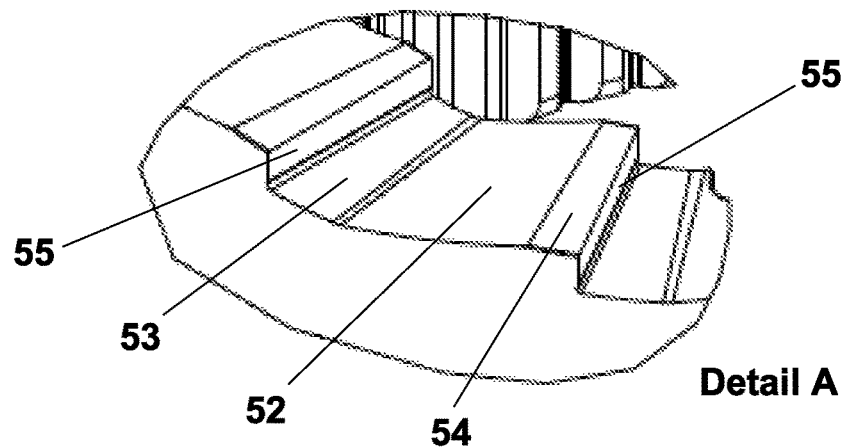
FIG. 16 is a detail view of the teeth of one of the internal ratchet gears.
Figure 17:
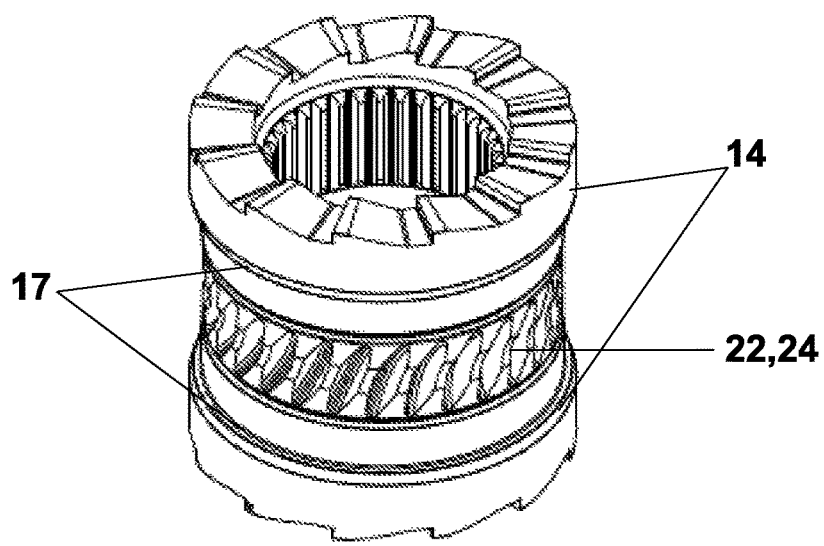
FIG. 17 is a perspective view of the worm wheel and the two internal ratchet gears.

Referring to the drawings, and more particularly to FIGS. 14-16, the ratchet arrangement 14 has a plurality of interoperable ratchet teeth 31, 50 on both pairs of inner and outer ratchet gears 17, 16. The interoperable ratchet teeth 31, 50 are on mutually opposing surfaces 30, 49 of the inner and outer ratchet gears 17, 16. The interoperable ratchet teeth 31, 50 are carried on annular shaped surfaces 30, 49 of the mutually opposing surfaces of the inner and outer ratchet gears 17, 16. Each tooth 31 has a ramp 52 and this ramp 52 is helically swept. Each tooth 31 has a lower flat landing 53, ramp 52 and an upper flat landing 54. The upright portion 55 between an edge of the upper flat landing 54 and the lower flat landing 53 of two adjacent teeth 31, 50 provide the surface of action during the low speed high torque phase of fastener tightening or loosening. By surface of action we mean the surface through which the majority of the torque is transmitted by the ratchet arrangement 14.

The dimensions of the teeth 31, 50 on each annulus 30, 49 are selected to correspond to the stroke of the piston 61 of the cylinder and piston assembly 34.

Figure 20:
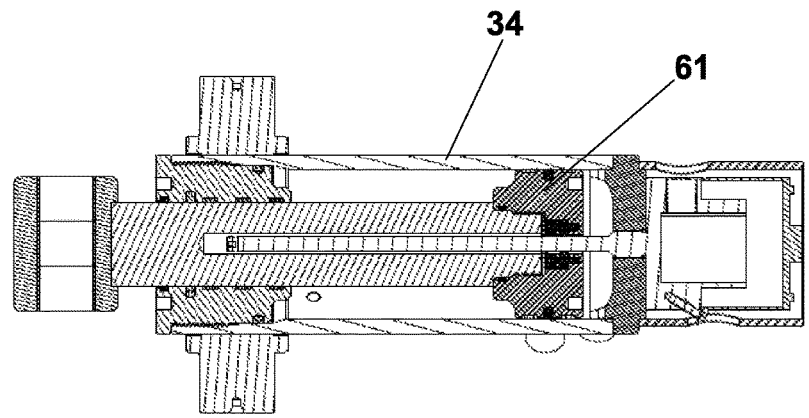
FIG. 20 is a section view of the cylinder and piston assembly in a withdrawn position.
Figure 21:
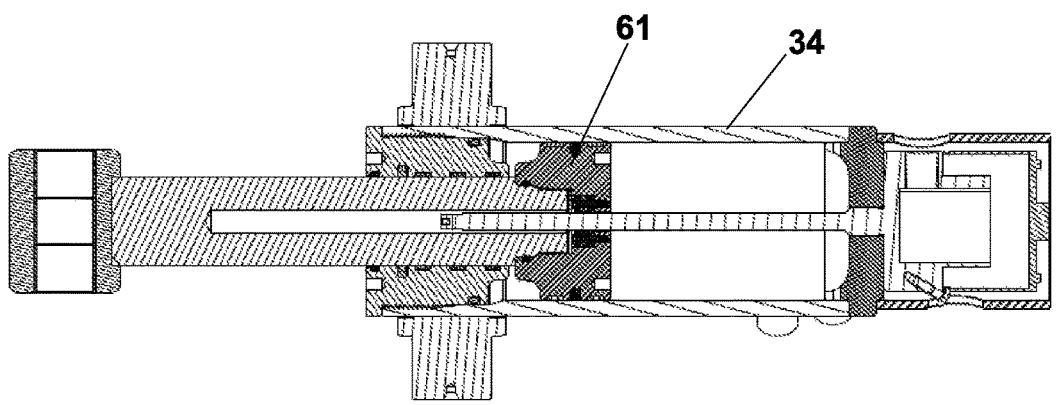
FIG. 21 is a section view of the cylinder and piston assembly in an extended position.

In use, the full stroke of the piston 61 of the cylinder and piston assembly 34 is illustrated in FIGS. 20-21, as well as FIGS. 5-8, from a fully extended position (e.g., see FIGS. 7, 8 and 21) to a fully withdrawn position (e.g., see FIGS. 5, 6 and 20) and back to a fully extended position causes the interoperable ratchet teeth 31,50 on the outer ratchet gear 16 to move from a position where the surface of action 55 of correspondingly located teeth 31, 50 on mutually opposing surfaces of the inner and outer ratchet gears 17, 16 are in abutment (e.g., see FIG. 19*a*), to where these surfaces are pulled apart and the ramps 52 of the teeth 50 on the outer ratchet gear 16 slide up along the ramps 52 of the teeth 31 on the inner ratchet gear 17 (e.g., see FIG. 19*b*) until the upper lands 54 of inner and outer ratchet gears 16, 17 pass each other (e.g., see FIG. 19*c*) causing the upper lands 54 of the outer ratchet gears 16 to drop onto the lower lands 53 of the inner ratchet gears 16 (e.g., see FIGS. 19*d* and 19*e*) wherein the piston 61 is in the fully withdrawn position and wherein extension of the piston 61 causes the surfaces of action 55 to engage and drive the inner ratchet gear 17 through an angular rotation causing the fastener to be rotated through an angular rotation thereby applying a make up or break out torque to the fastener (e.g., see FIGS. 19*e*-19*f*). The twelve teeth 31, 50 on the annulus of the inner and outer ratchet gears 17, 16 in combination with the stroke of the piston 61 determine the angular rotation each piston stroke applies which is 30 degrees in this instance.

In the present invention, the stroke of the piston 61 is capable of causing one surface of action 55 to travel from an abutting relationship with a surface of action 55 of one mutually opposing tooth 31 up along the ramp 52 and into abutment with the surface of action 55 of the adjacent tooth 31. Advantageously, this allows the outer ratchet gear 16 of the present invention to take one bite at a time out of the inner ratchet gear 17. Further advantageously, this allows an operator to know that the piston and cylinder assembly 34 has reached the actual force value at the end of the stroke which the piston and cylinder assembly 34 is calibrated to achieve. This allows more accurate measurement of the torque applied to the fastener for recording compliance purposes.

It will of course be appreciated that the stroke of the piston 61 will have a small travel in reserve for overrun and a home position. The exemplary stroke of the piston is 130 mm rotating the fastener 30 degrees. The two pairs of ratchet gears 16, 17 on opposing sides of the worm wheel 24 are handed.

Figure 3:
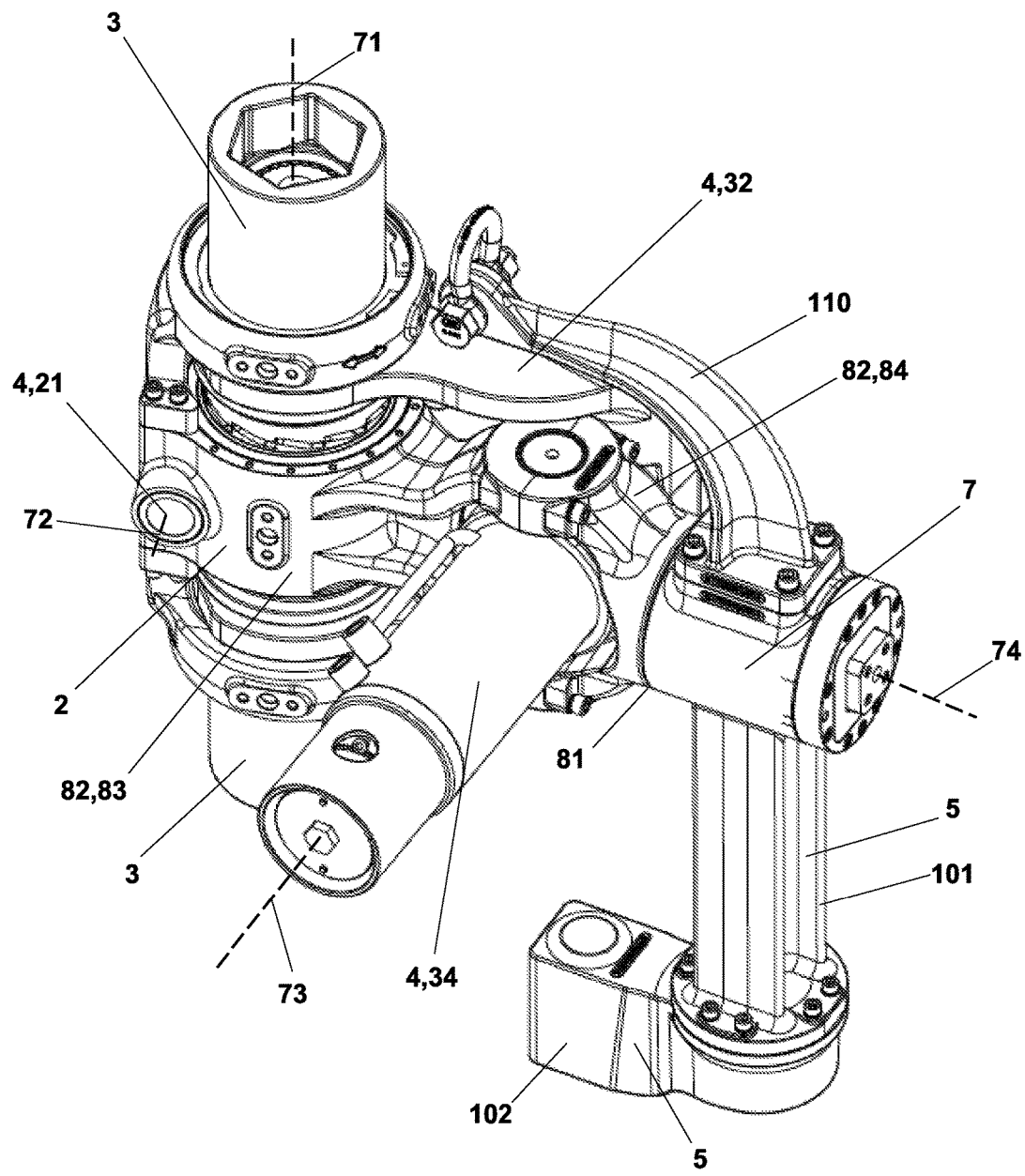
FIG. 3 is a perspective view of the torque wrench assembly omitting the flange mountable collar.
Figure 4:
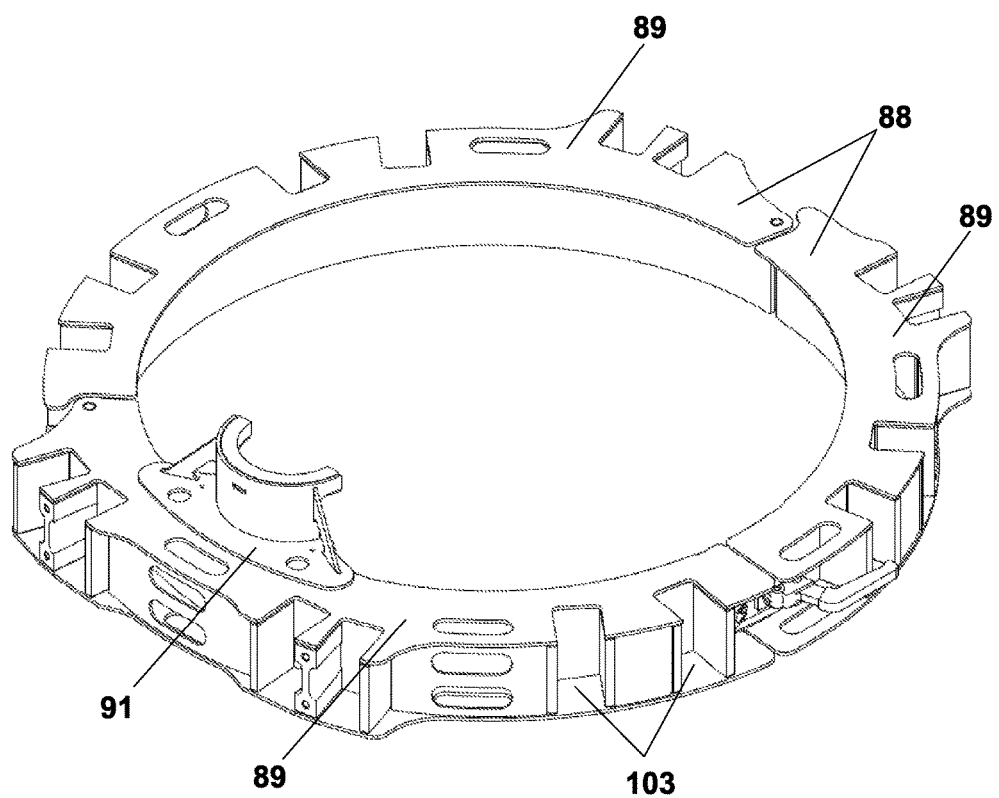
FIG. 4 is a perspective view of the flange mountable collar.
Figure 5:
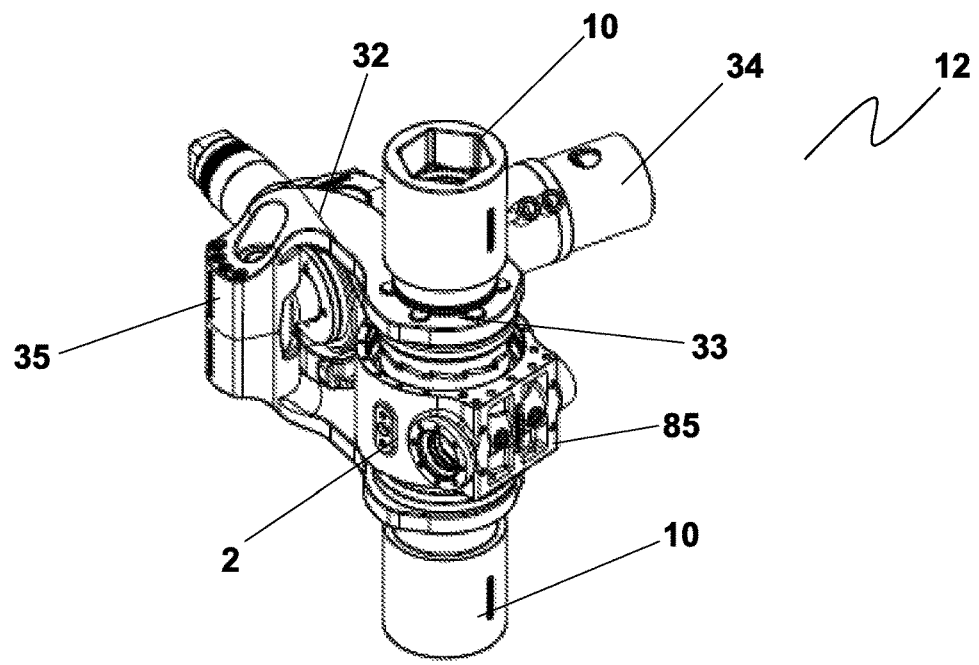
FIG. 5 is a perspective view of the torque wrench head and rotational coupling with the cylinder and piston assembly in a retracted position.
Figure 6:
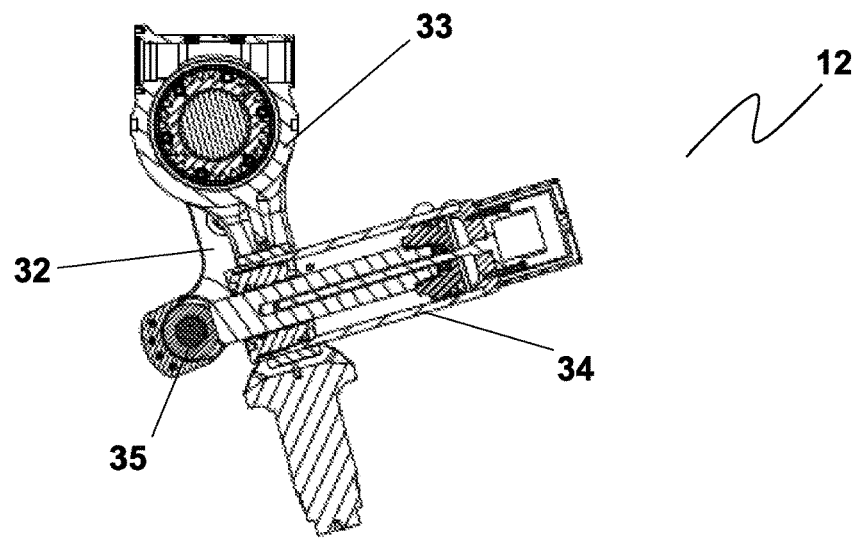
FIG. 6 is a sectional plan view of the torque wrench head and rotational coupling with the cylinder and piston assembly in a retracted position.
Figure 7:
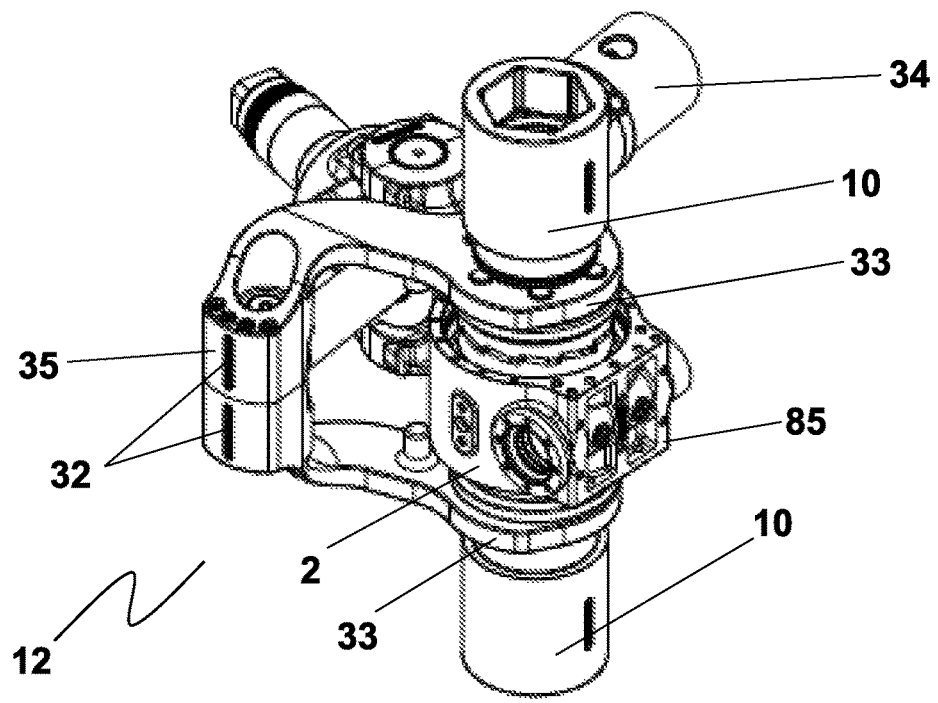
FIG. 7 is a perspective view of the torque wrench head and rotational coupling with the cylinder and piston assembly in an extended position.
Figure 8:
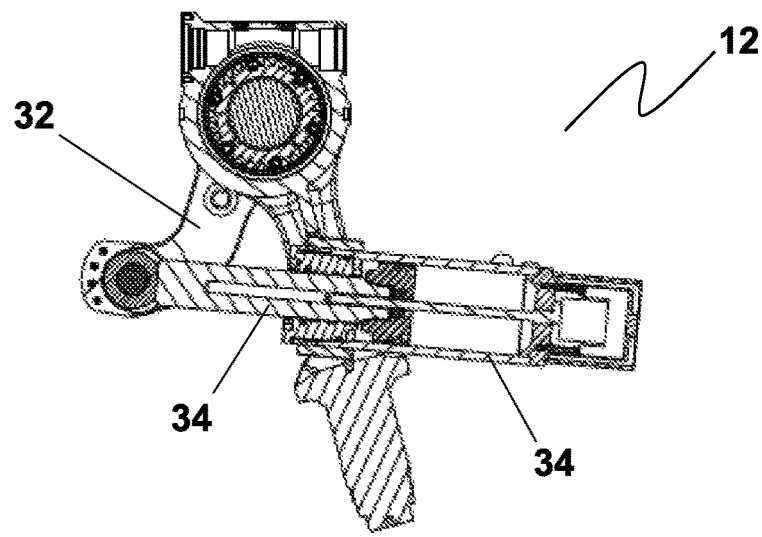
FIG. 8 is a sectional plan view of the torque wrench head and rotational coupling with the cylinder and piston assembly in an extended position.

With reference to FIG. 3, the fastener engaging arrangement 3 has a longitudinal axis 71 corresponding with the axis of rotation of the fastener engaging arrangement 3. The axis of rotation 72 of the worm 23 of the low power high speed drive arrangement 11 extends perpendicular to the axis of rotation 71 of the fastener engaging arrangement 3. The worm 23 engages the worm gear 24 tangentially driving the fastener engaging arrangement 3 in the one direction. The orientation of the axis of rotation 72 of the worm 23 and the axis of rotation 71 of the fastener engaging arrangement 3 are fixed relative to one another. The cylinder and piston assembly 34 of the high torque low speed drive arrangement 12 has a longitudinal axis 73 corresponding to the axis of the stroke 73 of the piston rod 38. The axis of stroke 73 of the piston rod 38 is perpendicular to the axis of rotation 71 of the fastener engaging arrangement 3. The axis of rotation 74 of the rotatable coupling arrangement 7 coupling the torque wrench head 2 to the mounting assembly 5 is perpendicular to the axis of the stroke 73 of the piston rod 38. The axis of rotation 74 of the rotatable coupling arrangement 7 coupling the torque wrench head 2 to the mounting assembly 5 is perpendicular to the axis of rotation 71 of the fastener engaging arrangement 3.

The axis of rotation 74 of the rotatable coupling arrangement 74 coupling the torque wrench head 2 to the mounting assembly 5 intersects the axis of rotation 71 of the fastener engaging arrangement 3. The axis of rotation 74 of the rotatable coupling arrangement 7 coupling the torque wrench head 2 to the mounting assembly 5 intersects the axis of rotation 72 of the worm 23. The axis of rotation 74 of the rotatable coupling arrangement 7 coupling the torque wrench head 2 to the mounting assembly 5 intersects the axis of stroke 73 of the piston rod 38.

Advantageously, in use the alignment of the axis of rotation 74 of the rotatable coupling arrangement 7 with each of the axis of rotation 72 of the worm 23 and the axis of stroke 73 of the piston rod 38 means that rotation of these components through 180 degrees about the axis of rotation 74 of the rotatable coupling arrangement 7 causes the worm 23 and the piston 38 to rotate the fastener engaging arrangement 3 in the opposite direction. In other words, when the torque wrench head 2 is in a first position the fastener engaging arrangement 3 rotates clockwise and when the torque wrench head 2 is rotated through 180 degrees about the rotatable coupling arrangement 7, the fastener engaging arrangement 3 rotates in an anti-clockwise direction. This is what allows the torque wrench assembly 1 to provide break out and make up of the fastener without stripping down the tool. The torque wrench head 2 is rotatable about the rotatable coupling arrangement 7 about joint 81.

The axis of the stroke 73 of the piston rod 38 and the worm gear 23 are coplanar. The axis of the stroke 73 of the piston rod and a symmetrical radial plane of the worm gear 24 are coplanar. By symmetrical radial plane we mean a plane which would divide the worm gear 24 into two symmetrical halves in a plane perpendicular to the longitudinal axis of the fastener engaging arrangement 3. The worm gear 24 is centrally mounted on the fastener engaging arrangement 3. The inner ratchet gears 17, the outer ratchet gears 16 and the bifurcated end 33 of the lever ratchet arm 32 are symmetrically mounted on the fastener engaging arrangement 3 about the worm gear 24. Advantageously, the central mounting of the worm gear 24 on the shaft 9 of the fastener engaging arrangement 3 in combination with the planar alignment of the stroke axis 73 of the piston rod 38 and the worm gear 24 as well as the symmetrical mounting of the inner ratchet gears 17, the outer ratchet gears 16 and the bifurcated end 33 of the lever ratchet arm 32 about the worm gear 24 means that the maximum amount of force generated by the cylinder and piston assembly 34 is transferred into torque via the lever ratchet arm 32 and is uniformly distributed onto the shaft 9 of the fastener engaging arrangement 3 for both clockwise and anticlockwise rotation. This means that the transfer of force from the cylinder and piston assembly 34 to the fastener is efficient with minimum loss of energy through twisting of the torque wrench assembly 1 as a result of misalignment of the forces.

Referring particularly to FIG. 3, the torque wrench head 2 has a main body 82 formed for receiving the fastener engaging arrangement 3, the cylinder and piston assembly 34 and the motor 21 and worm 23. The main body 82 of the torque wrench head 2 has a first collar 83 for receiving the fastener engaging arrangement 3 and a second collar 84 for receiving the cylinder and piston assembly 34. The collars 83, 84 are arranged so that the axis of rotation 71 of the fastener engaging arrangement 3 and the axis of the stroke 73 of the cylinder and piston assembly 34 are perpendicular. The collar 83 for receiving the fastener engaging arrangement 3 has a bearing housing to facilitate rotation of the journalled portion of the fastener engaging arrangement 3. The collar 83 for receiving the fastener engaging arrangement 3 has a support frame 185 for locating and retaining the worm 23 and/or motor 21 thereon. The collar 83 for receiving the fastener engaging arrangement 3 has a cutaway portion for allowing the worm 23 to engage with the worm gear 24. The main body 82 of the torque wrench head 2 has a coupling arrangement 7 for operably coupling the main body to the mounting assembly 5. The coupling arrangement 7 for operably coupling the main body 2 to the mounting assembly 5 is a rotational coupling arrangement 7 and most preferably a pivotal coupling arrangement 7. A bearing housing mounted in the pivotal coupling arrangement 7 for supporting a rotational shaft extending from the main body 82 of the torque wrench head 2 allows the pivotal movement of the head 2 relative to the mounting assembly 5. The coupling arrangement 7 for operably coupling the main body 82 to the mounting assembly 5 allows the toque wrench head 2 to rotate relative to the mounting assembly between a fastener make up and fastener break out position.

Referring to the drawings, and more particularly to FIGS. 1-4 and 10-13, the torque wrench assembly 1 further has a mounting assembly 5 for mounting the torque wrench assembly 1 on a flange 6. Drilling equipment consists of a series of riser sections 85 joined together in a string via flanges 6 on the end of adjacent riser sections 85 and fasteners 86 mechanically coupling the adjacent flanges 6 together (e.g., see FIGS. 23-29). The joined riser sections 85 are lowered with other related subsea equipment onto a drilled well. The riser sections 85 are securely fastened by the flanges 6 on the end of the riser sections 85. The threaded bores 87 of adjacent flanges 6 are aligned and the flanges 6 are mechanically coupled by a hydraulic torque wrench assembly driving threaded fasteners 86 into the aligned bores 87 for mechanically coupling them together. The bores 87 of the lower flange 6 have threaded nuts housed therein for receiving the threaded end of the threaded fasteners 86.

The mounting arrangement 5 is formed for mounting the torque wrench assembly 1 on one of the flanges 6 namely the upper flange 6 of the pair to be coupled together. The mounting arrangement 5 has a multi-part collar 88. The multi-part collar 88 comprises three arcuate components 89. Two of the arcuate components 89 are pivotally coupled together. The collar 88 is formed for enclosing the external surface of the flange 6 with a releasable locking arrangement 90 for securely locking the collar 88 in position. A clamp 90, most preferably a toggle clamp 90 provides the releasable locking arrangement for locking the collar 88 onto the flange 6. The collar 88 has a locating member 91 preferably reinforced for locating the collar 88 on the flange 6. The flange 6 has a fixed locating member 93. The fixed locating member 93 of the flange 6 comprises a pipe 93 protruding longitudinally out of the main plane of the flange 6. The pipe 93 protrudes generally substantially perpendicular to the main plane of the flange 6 and parallel to the main riser section 85. The locating member 91 of the collar 88 is formed for engagement with the fixed locating member 93 of the flange 6. The locating member 91 of the collar 88 is then fixed relative to the through bores 87 of the flange 6. The flange locating member 91 of the collar 88 is located on the internal circumference of the collar 88. The flange locating member 91 of the collar 88 is a female locating member 91 for receiving the fixed locating member 93 of the flange 6.

The mounting assembly 5 has a spacer 101 for coupling the mounting assembly 5 to the collar 88. The spacer 101 is a leg and is a structural support beam hereinafter and commonly referred to as a reaction arm 101. The reaction arm 101 and the collar 88 have correspondingly located male and female engaging member 102, 103 for releasably interlocking these components together. One end 104 of the reaction arm 101 has a male engaging member 102 for engaging with a plurality of female locating members 103 on the external circumference of the collar 88. The male engaging member 102 and the female engaging members 103 are formed for releasable interlocking for preventing axial and/or radial and/or twisting movement of the torque wrench head 2 relative to the fastener 86 during application of high torques. The female engaging members 103 comprise 16 slots 103 tapering from a base to an opening in the circumference of the collar 88. The slots 103 are trapezoidal. The male engaging member 102 is a reaction foot 102 protruding from the bottom of the reaction arm 101. The foot 102 also has a trapezoidal form for preventing radial or lateral or twisting movement of the torque wrench head 2 relative to the fastener 86 during application of high torque.

One end 104 of the reaction arm 101 has a foot 102 for engaging with a plurality of female locating/engaging members 103 on the external circumference of the collar 88. The locating member 91 on the collar 88 for locating the reaction arm 101 is provided proximal to the through bores 87 of the flange 6. Advantageously, the position of the collar 88 relative to the fixed locating member 91 of the flange is known and the position of the through bores 87 of the flanges 6 relative to the fixed locating member 91 is known. This allows the position of the female engaging members 103 of the collar 88 to be designed into the collar 88. The female engaging members 103 of the collar 88 have a pair of engaging members 103, most preferably slots, for each flange through bore 87. Advantageously, this provides a locating position for the torque wrench head 2 for make up and break out of the same fastener. The locating means on the collar for locating the reaction arm are positioned so that the torque wrench head do not engage any of the pipes on the flange during operation of the torque wrench head.

The other end of the spacer 101 carries the rotational coupling arrangement 7. The mounting assembly also has an arrangement 110 for coupling external lifting gear. The coupling arrangement 110 for external lifting gear is located at or about the centre of gravity of the torque wrench assembly 1. Advantageously, this prevents the torque wrench assembly 1 from swinging around when lifted by external lifting gear. This reduces the risk to the operators and the time to for the torque wrench assembly 1 to settle into a working position when being moved or craned into position.

Figure 23:
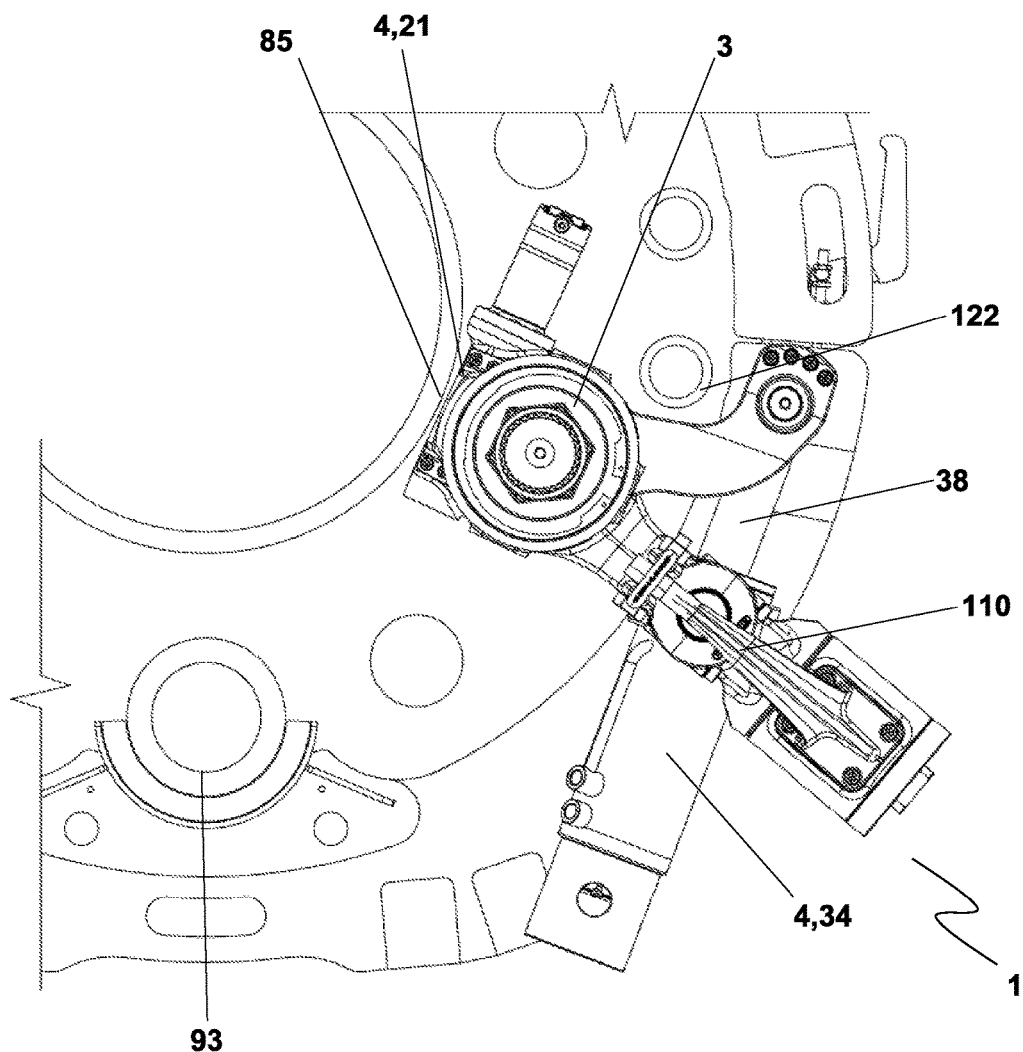
FIG. 23 is a top plan view of a torque wrench assembly mounted on a fastener in a break out position.
Figure 24:
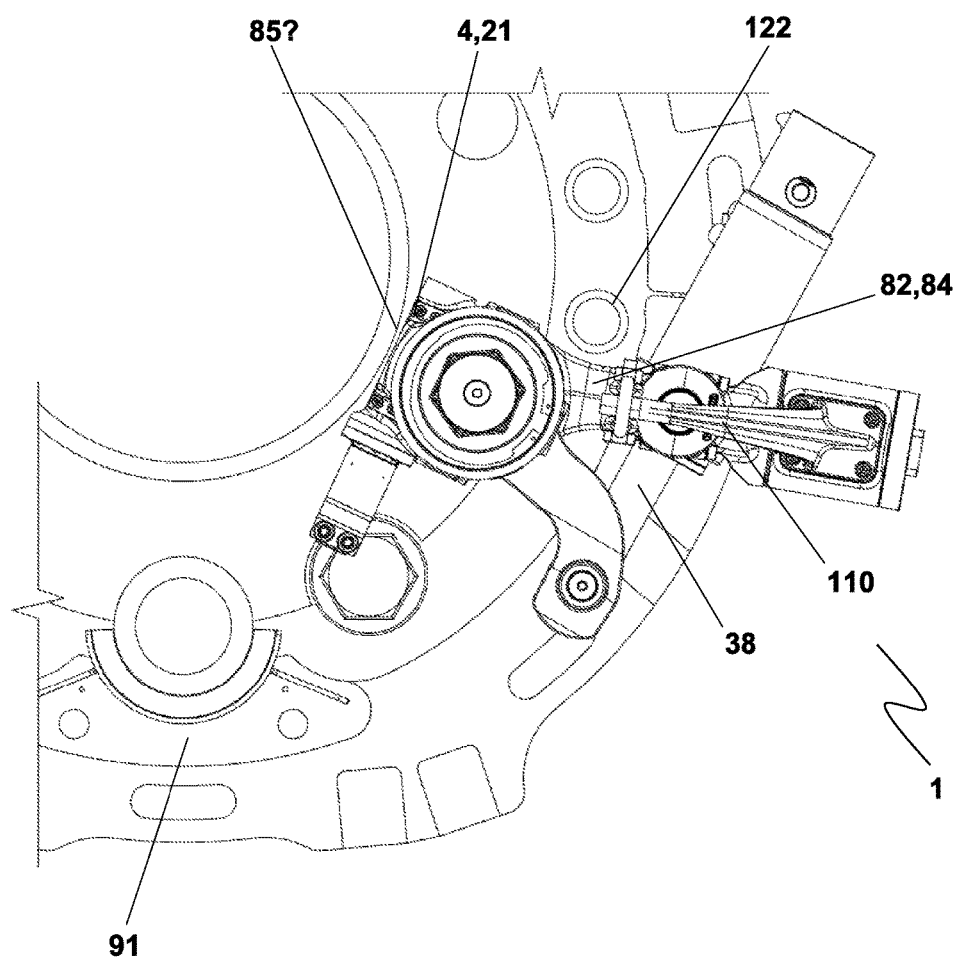
FIG. 24 is a top plan view of a torque wrench assembly mounted on the same fastener in a make up position.

Referring to the drawings, and now to FIGS. 23-24, there is shown the torque wrench assembly 1 mounted on a fastener in a fastener break out position and a fastener make up position respectively. In both of these positions, the distance between the axis of rotation of the fastener engaging arrangement 3 and the external surface of any part of the torque wrench head 2 in the direction towards the riser 85 is less than the distance between the axis of rotation of the fastener engaging arrangement 5 and the external cylindrical surface of the riser 85 when measuring these distances in the same plane. In other words, a gap exists between the outside surface of the support frame 185 for locating and retaining the worm 23 and/or motor 21 thereon and the riser 85 or any pipe in both make up and break out position. In the break out position a gap also exists between the leading edge of the lever ratchet arm 32 and the outside cylindrical surface of the service pipe 122 when the piston rod 38 is in the fully extended position. In the make up position a gap also exists between the leading edge of the main body 82 and the outside cylindrical surface of the service pipe 122.

Figure 25:
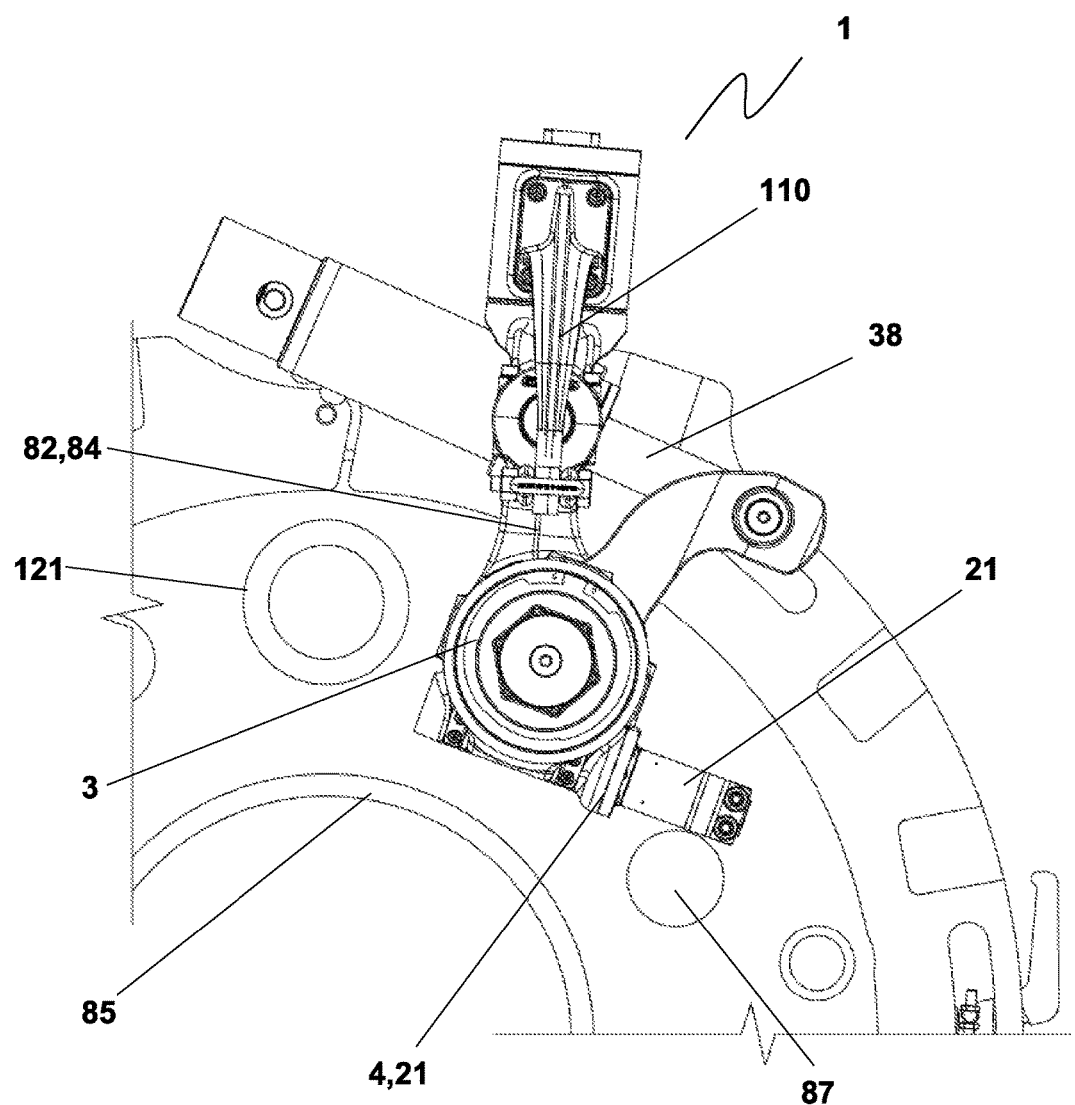
FIG. 25 is a top plan view of a torque wrench assembly mounted on a second fastener in a make up position.
Figure 26:
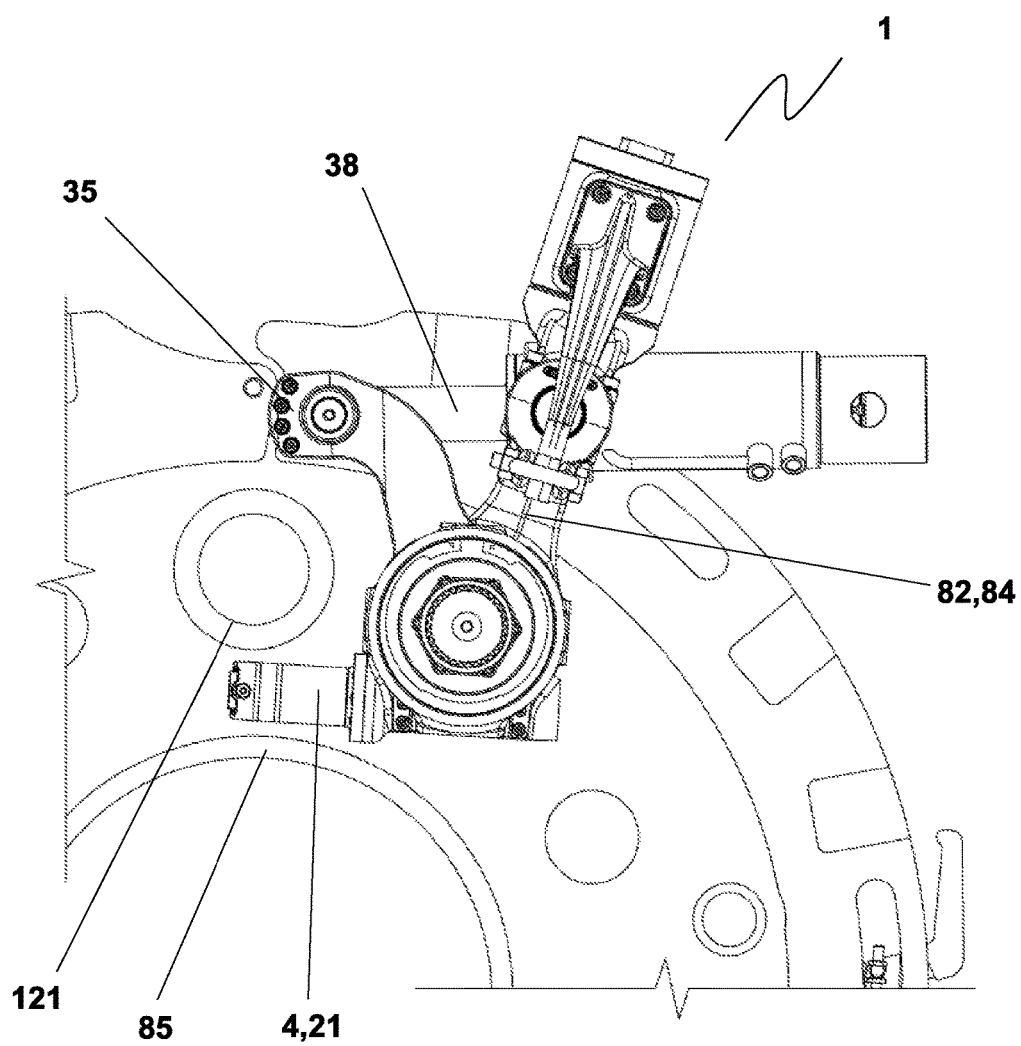
FIG. 26 is a top plan view of a torque wrench assembly mounted on the second fastener in a break out position.
Figure 27:
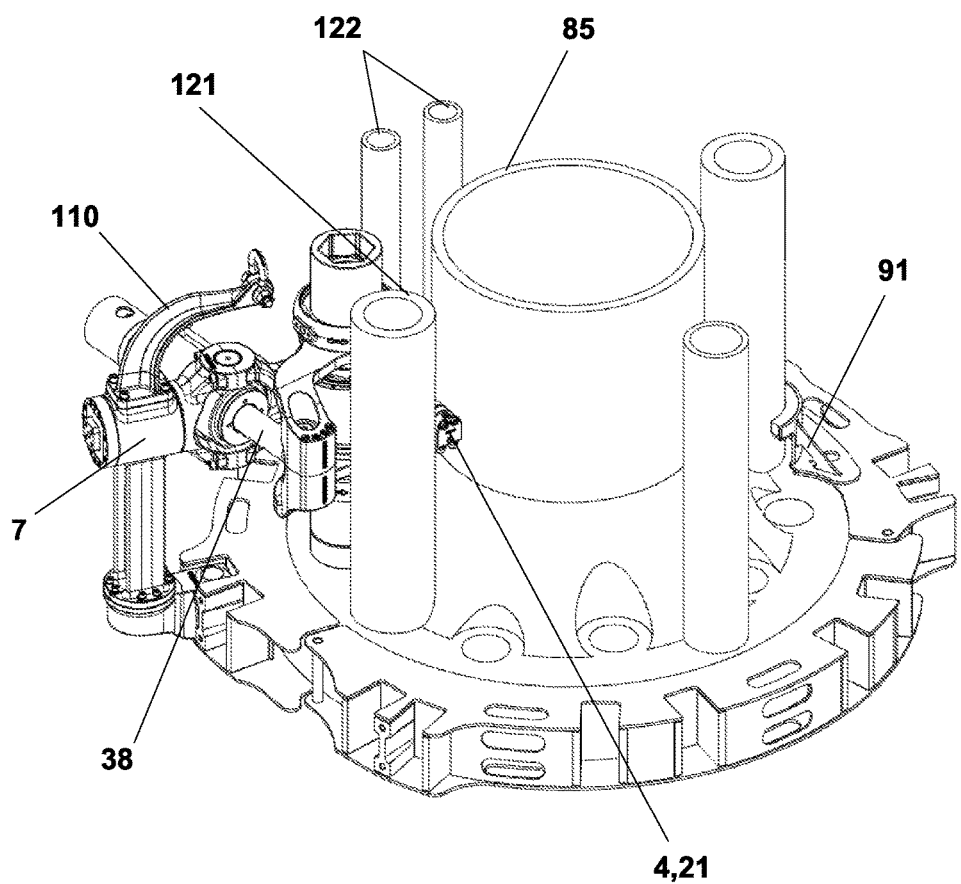
FIG. 27 is a perspective view of the torque wrench assembly mounted on the collar with the piston fully extended and the motor of the worm located between the riser section and a service pipe.
Figure 28:
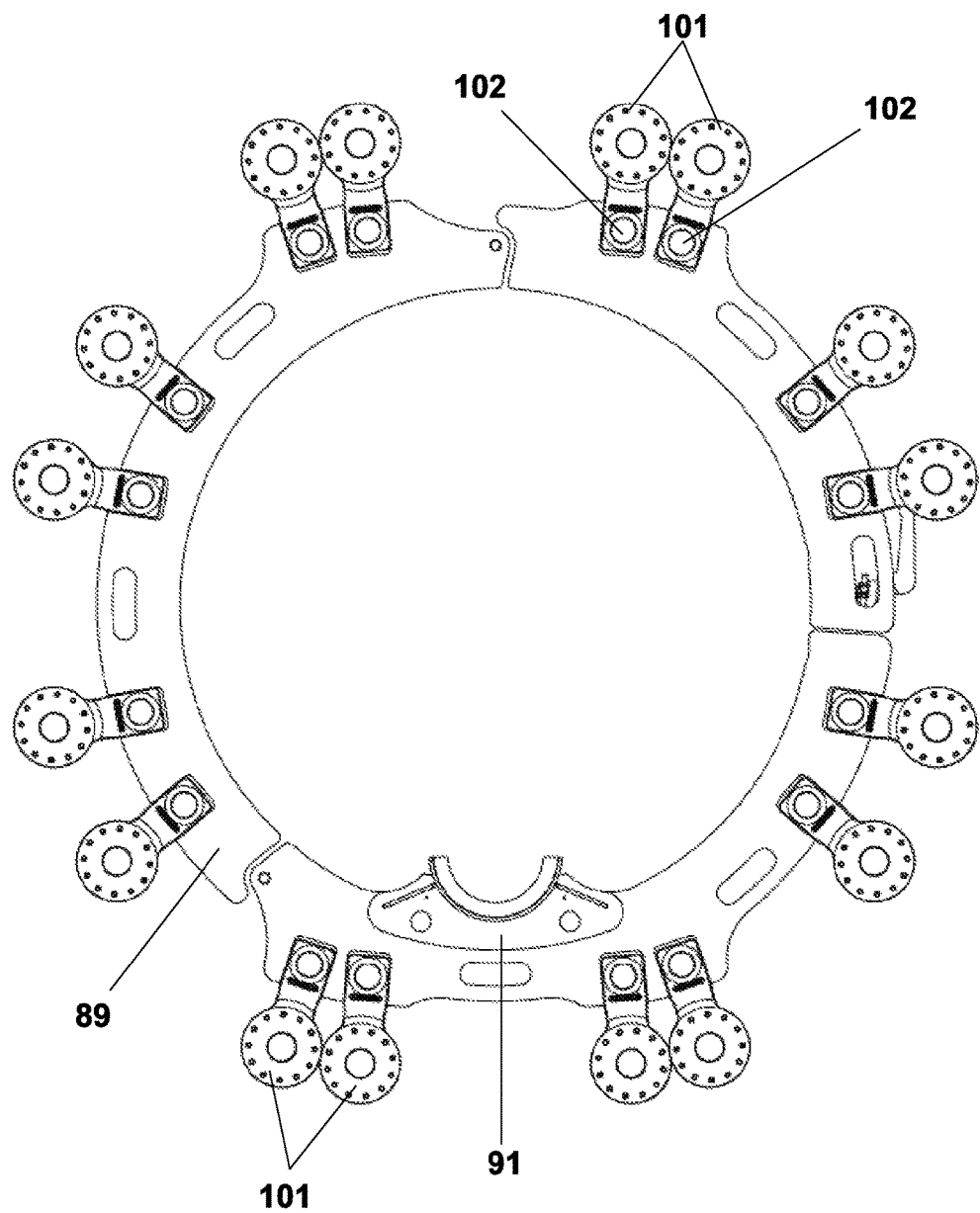
FIG. 28 is a top plan view of the collar showing the foot of the mounting assembly located in the female engaging members of the collar.

Referring to the drawings, and now to FIGS. 25-26, there is shown the torque wrench assembly 1 mounted on a fastener in a fastener make up position and a fastener break out position respectively. FIG. 26 in particular illustrates one of the major design limitations on the torque wrench head 2. When mounted on a fastener proximal to a service pipe 121 of the flange 6, the torque wrench head 2 is designed so that the piston shaft 38 can be fully extended holding the lever arm 32 in a forward position without coming into contact with the service pipe 121. The motor 21 of the worm 23 is dimensioned and located on the fastener engaging arrangement 3 so as to sit between the riser 85 and the service pipe 121. The motor 21 extends tangentially from the worm wheel 24 in the same direction as the direction of extension of the piston rod 38 so as to avoid engaging the service pipe 121 or the riser 85 in the break out position (e.g., see FIG. 25). An exemplary minimum distance between the service pipe 121 and the second end 35 of the lever ratchet arm is 25 mm. An exemplary minimum distance between the motor 21 and the riser 85 is 6 mm. An exemplary minimum distance between the service pipe 121 and the riser 85 is 10 mm.

Figure 29:
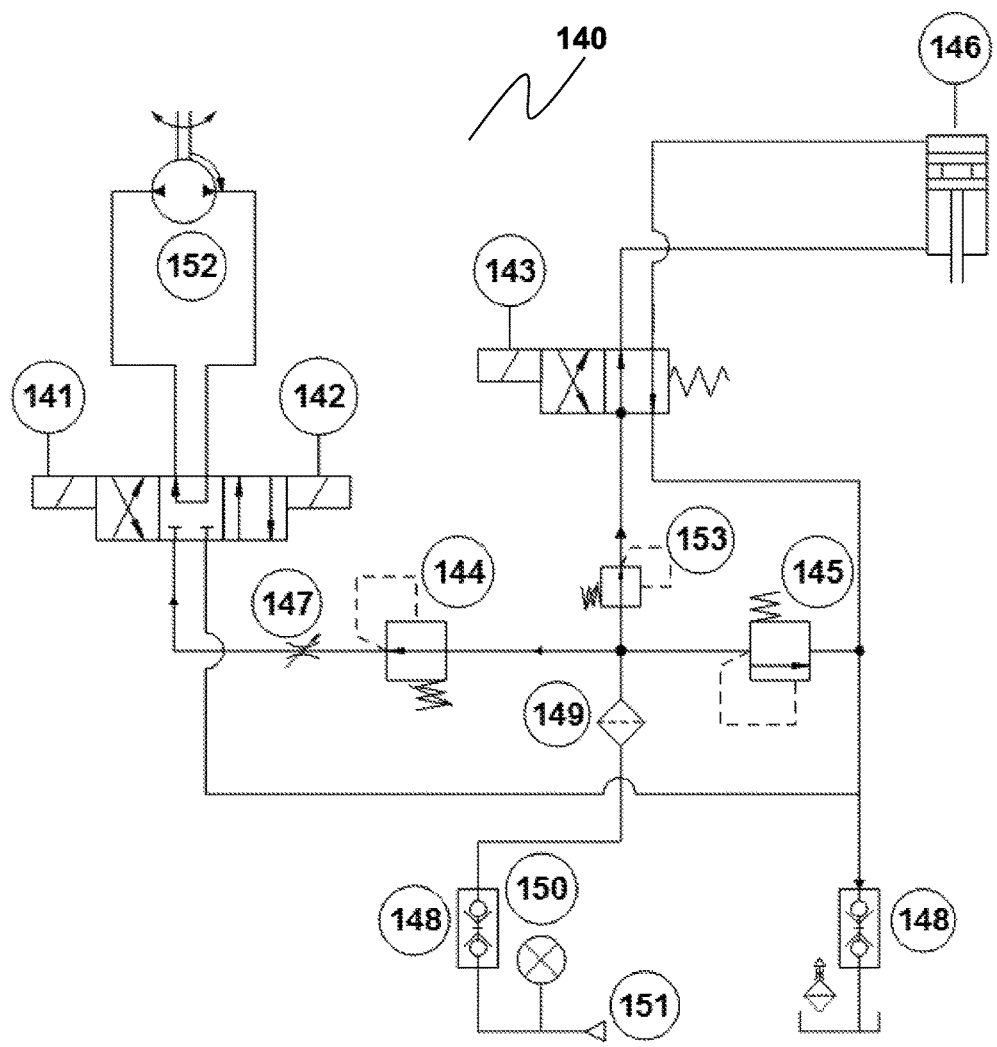
FIG. 29 is a schematic view of an electro-hydraulic system for controlling the operation of the hydraulic torque wrench.

Referring to the drawings, and now to FIG. 29, there is show a schematic control circuit for the electro hydraulic control of a hydraulic torque wrench 1 preferably of the type described herein.

The circuit 140 has a hydraulic supply 151 capable of supplying pressures up to 3000 psi. The hydraulic supply 151 has a pressure gauge 150 and a quick disconnect switch 148. A filter 149, exemplary 5 microns is provided on the hydraulic supply line. The hydraulic supply line supplies hydraulic fluid to a bi-directional orbital motor 152 though a three position four way valve which is under the control of solenoids 141 and 142. The solenoids 141 and 142 are 24V DC operable. The electrical supply is a 110/240v AC so a converter is required to supply the DC power supply. The hydraulic supply line to the motor 152 has a pressure reducing valve 144 with a upper limit of 25 bar and an adjustable orifice 147. The hydraulic supply line to the cylinder and piston assembly 146 has a solenoid 143 for controlling a valve and a pressure reducing valve 153 with an upper limit of approximately 105 bar. Again, the solenoids 143 are 24V DC operable. The hydraulic supply line has a pressure relief valve 145 set to operate at approximately 210 bar. Both the motor 152 and the cylinder and piston arrangement 146 have a return line.

In use, when an operator activates the hydraulic torque wrench from the home position, an electrical signal is sent to an electronic control system. This initiates the first phase where the high speed low torque arrangement 12 is activated by the signal sent to an electronic control panel (not shown in the drawings) and subsequently this signal is transmitted to the solenoid valve 141. This controls the flow of hydraulic fluid to the orbital motor 152 by shifting the position of the four way valve. The delivery of hydraulic fluid rotates the orbital motor 152 and due to this rotation the orbital motor 152 rotates the fastener via the rotation of the torque wrench head 2. When the fastener is fully "made up" in this first phase, hydraulic pressure will increase to approximately 25 bar once the adjustable orifice 147 which controls the speed of flow is fully opened. This high pressure will cause the orbital motor 152 to cease rotation and excess pressure will vent through a pressure reducing valve 145 into a tank. A feedback signal is transmitted to the control panel to indicate that the motor 152 has reached the desired torque. Upon receiving this feedback signal the control panel relays a signal to the solenoid valve 143. This again shifts the position of associated valve enabling pressure to build within the hydraulic cylinder. In this case hydraulic pressure is directed to the blind side of the hydraulic cylinder and piston assembly 34/146. This build-up of pressure will force the hydraulic cylinder and piston assembly 34 to fully extend, further rotating the fastener by approximately 30 degrees. The hydraulic piston rod positional indicator 146 transmits a feedback signal to the electronic control panel. Based upon previously recorded information the hydraulic piston rod 38 within the hydraulic cylinder and piston assembly 34 will retract to the home position and extend and retract within its working stroke and pre-set pressure range until the fastener has reached the required torque. Once the required torque has been achieved an indicator will notify the operator. This will significantly reduce the risk of human error and enables the operator to release the torque wrench 1 from the currently fastened fastener and relocate the wrench to the next fastener in the fastening sequence. The torque measurements are stored within the electronic control package such that once within a safe location an operator can download the information for future reference and inspection. The break out torque value will be 90% of the total capacity of the torque wrench assembly.

In the preceding discussion of the invention, unless stated to the contrary, the disclosure of alternative values for the upper or lower limit of the permitted range of a parameter, coupled with an indication that one of the said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof.

What is claimed is:

1. A torque wrench assembly, comprising:
a torque wrench head being adapted to both tighten and loosen a fastener, the torque wrench head comprising a fastener engaging arrangement and a drive arrangement for driving the fastener engaging arrangement; and
an assembly for mounting the torque wrench assembly on a support, the torque wrench head and the mounting assembly being adapted so that the torque wrench head is capable of both tightening a fastener and loosening a fastener, wherein the torque wrench head is movably mounted on the mounting assembly so that the torque wrench head is capable of both tightening a fastener and loosening a fastener by moving the torque wrench head relative to the mounting assembly between a fastener tightening position and a fastener loosening position, wherein the torque wrench head is rotatably coupled to the mounting assembly via a rotatable coupling arrangement such that the torque wrench head is free to rotate relative to the mounting assembly in a clockwise or anticlockwise direction.

2. The torque wrench assembly as claimed in claim 1, further comprising a locking arrangement provided between the torque wrench head and the mounting assembly, wherein the locking arrangement is adapted to lock the torque wrench head and the mounting assembly together so no relative movement is possible in at least a fastener loosening position and a fastener tightening position.

3. The torque wrench assembly as claimed in claim 1, wherein the drive arrangement comprises a low torque high speed drive arrangement and a low speed high torque drive arrangement.

4. The torque wrench assembly as claimed in claim 3, further comprising a ratchet arrangement operably coupled to the fastener engaging arrangement, wherein the low speed high torque drive arrangement and the high speed low torque drive arrangement are operably coupled via the ratchet arrangement.

5. The torque wrench assembly as claimed in claim 4, wherein the ratchet arrangement is adapted so as to allow the high speed low torque drive arrangement to operate independently of the low speed high torque drive arrangement with the ratchet arrangement disengaged.

6. The torque wrench as claimed in claim 4, wherein the ratchet arrangement is adapted so as to allow the low speed high torque drive arrangement to engage the high speed low torque drive arrangement when rotating the fastener into a final position at a predetermined torque setting.

7. The torque wrench assembly as claimed in claim 4, wherein the high speed low torque drive arrangement comprises a motor and a worm gear assembly operably coupling the motor to the fastener engaging arrangement, the worm gear assembly comprising a worm and a worm wheel.

8. The torque wrench assembly as claimed in claim 7, wherein the worm wheel is mechanically coupled to a pair of internal ratchet gears of the ratchet arrangement via a coupling arrangement.

9. The torque wrench assembly as claimed in claim 4, wherein at least part of the low torque high speed drive arrangement are mounted on the fastener engaging arrangement, and wherein at least part of the ratchet arrangement is symmetrically mounted on the fastener engaging arrangement about the part of the low torque high speed drive arrangement mounted on the fastener engaging arrangement.

10. The torque wrench assembly as claimed in claim 9, wherein at last part of the high torque low speed drive arrangement being symmetrically mounted on the fastener engaging arrangement about the part of the low torque high speed drive arrangement mounted on the fastener engaging arrangement.

11. The torque wrench assembly as claimed in claim 3, wherein the high torque low speed drive arrangement comprises:
a lever ratchet arm having a first end rotatably mounted on the shaft of the fastener engaging arrangement; and
a cylinder and piston assembly operably coupled between a second end of or along the length of the lever ratchet arm and the torque wrench head.

12. The torque wrench assembly as claimed in claim 11, further comprising:
a ratchet arrangement operably coupled to the fastener engaging arrangement, wherein the low speed high torque drive arrangement and the high speed low torque drive arrangement are operably coupled via the ratchet arrangement, and wherein the lever ratchet arm comprises:
an elongate lever having a first part operably coupled to the piston and a second bifurcated end, each fork of the bifurcated end having a through bore for receiving the shaft of the fastener engaging arrangement;
wherein each fork of the bifurcated end of the lever ratchet arm comprises an external ratchet gear with through bore mounted thereon and being operably couplable to a correspondingly located internal ratchet gear on the ratchet arrangement; and
wherein the interacting ratchet arrangements of the internal and external ratchet gears are adapted to allow the ratchet arrangements to slip past each other during the high speed low torque phase of the bolt tightening or loosening.

13. The torque wrench assembly as claimed in claim 12, wherein the ratchet arrangement comprises a plurality of interoperable ratchet teeth on at least one pair of internal and external ratchet gears, the interoperable ratchet teeth are on mutually opposing surfaces of the internal and external ratchet gears, each tooth has a lower landing, a ramp and an upper landing, the upright portion between an edge of the upper landing and the lower landing of two adjacent teeth provide the surface of action during the low speed high torque phase of fastener tightening or loosening.

14. The torque wrench assembly as claimed in claim 13, wherein the full stroke of the piston of the cylinder and piston assembly from a fully extended position to a fully withdrawn position and back to a fully extended position causes the interoperable ratchet teeth on at least one external ratchet gear to move from a position where the surface of action of correspondingly located teeth on mutually opposing surfaces of the internal and external ratchet gears are in abutment to where these surfaces are pulled apart and the ramps of the teeth on the external ratchet gear slide up along the ramps of the teeth on the internal ratchet gear until the upper lands of internal and external ratchet gears pass each other causing the upper lands of the external ratchet gears to drop onto the and lower lands of the internal ratchet gears wherein the piston is in the fully withdrawn position and wherein extension of the piston causes the surfaces of action to engage and drive the internal ratchet gear through a rotation causing the fastener to be rotated through an angular rotation thereby applying a make up or break out torque to the fastener.

15. The torque wrench assembly as claimed in claim 12, wherein the high speed low torque drive arrangement comprises a motor and a worm gear assembly operably coupling the motor to the fastener engaging arrangement, the worm gear assembly comprising a worm and a worm wheel, and wherein the internal ratchet gears, the external ratchet gears and the bifurcated end of the lever ratchet arm are symmetrically mounted on the fastener engaging arrangement about the worm wheel.

16. The torque wrench assembly as claimed in claim 11, wherein the high speed low torque drive arrangement comprises a motor and a worm gear assembly operably coupling the motor to the fastener engaging arrangement, the worm gear assembly comprising a worm and a worm wheel, and wherein the axis of rotation of a rotational coupling arrangement coupling the torque wrench head to the mounting assembly intersects the axis of rotation of the worm, and wherein the axis of rotation of the rotational coupling arrangement coupling the torque wrench head to the mounting assembly intersects the axis of stroke of the piston of the cylinder and piston assembly.

17. The torque wrench assembly as claimed in claim 11, wherein the high speed low torque drive arrangement comprises a motor and a worm gear assembly operably coupling the motor to the fastener engaging arrangement, the worm gear assembly comprising a worm and a worm wheel, wherein the torque wrench head has a main body formed for receiving the fastener engaging arrangement, the cylinder and piston assembly and the worm, wherein the main body of the torque wrench head has a first collar for receiving the fastener engaging arrangement and a second collar for receiving the cylinder and piston assembly, and wherein the collars are arranged so that the axis of rotation of the fastener engaging arrangement and the axis of the stroke of the cylinder are perpendicular.

18. The torque wrench assembly as claimed in claim 17, wherein the collar for receiving the fastener engaging arrangement has a support frame for locating and retaining the worm thereon.

19. The torque wrench assembly as claimed in claim 11, further comprising a system for measuring and recording torque applied to a fastener comprising the cylinder and piston assembly having a position detector for detecting the travel position of a piston rod or piston and the cylinder and piston assembly having a pressure sensor for measuring the fluid pressure acting on the piston.

20. The torque wrench assembly as claimed in claim 1, wherein the mounting assembly is for mounting the torque wrench assembly on a flange of the support, the mounting assembly comprising a multi-part collar, wherein the collar is formed for enclosing the external surface of the flange with a releasable locking arrangement for securely locking the collar in position.

21. The torque wrench assembly as claimed in claim 20, wherein the collar has locating arrangements for locating the collar on the flange, wherein the flange has a plurality of fixed locating arrangements, and wherein the locating arrangements of the collar are formed for engagement with the fixed locating arrangements of the flange.

22. The torque wrench assembly as claim in claim 20, wherein the mounting assembly comprises a reaction arm for coupling the mounting assembly to the collar.

23. The torque wrench assembly as claimed in claim 1, the torque wrench assembly has a control system for controlling fastener make up and break out, the control system comprising a sensor arrangement for detecting a predetermined fluid pressure, and a fluid circuit for controlling the low speed high torque drive arrangement and the high speed low torque drive arrangement which are operable on the one fluid circuit, and wherein the control system is operable for monitoring fluid pressure from the sensor arrangement and operable for switching the fluid circuit between the high speed low torque drive arrangement and the low speed high torque drive arrangement.

* * * * *